United States Patent
Kimura et al.

(10) Patent No.: US 7,592,785 B2
(45) Date of Patent: Sep. 22, 2009

(54) OUTPUT CONTROL APPARATUS AND METHOD FOR FIELD WINDING TYPE DYNAMO-ELECTRIC MACHINE

(75) Inventors: Norihito Kimura, Hekinan (JP); Katsunori Tanaka, Haguri-gun (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 285 days.

(21) Appl. No.: 11/802,522

(22) Filed: May 23, 2007

(65) Prior Publication Data
US 2008/0186000 A1 Aug. 7, 2008

(30) Foreign Application Priority Data
May 23, 2006 (JP) .............................. 2006-142841

(51) Int. Cl.
H02P 11/00 (2006.01)
H02P 9/00 (2006.01)

(52) U.S. Cl. ............................. 322/59; 322/28; 322/37

(58) Field of Classification Search ................... 322/22, 322/23, 24, 28, 37, 59, 99
See application file for complete search history.

(56) References Cited

U.S. PATENT DOCUMENTS

| | | | |
|---|---|---|---|
| 5,272,429 A | | 12/1993 | Lipo et al. |
| 5,334,923 A | | 8/1994 | Lorenz et al. |
| 5,581,172 A | * | 12/1996 | Iwatani et al. .................. 322/28 |
| 5,936,377 A | | 8/1999 | Blaschke et al. |
| 5,973,474 A | | 10/1999 | Yamamoto |
| 6,321,606 B1 | | 11/2001 | Ishii et al. |
| 6,586,914 B2 | | 7/2003 | Garrigan et al. |
| 6,900,618 B2 | * | 5/2005 | Maehara ....................... 322/28 |
| 6,907,793 B2 | | 6/2005 | Reutlinger et al. |
| 6,975,080 B2 | | 12/2005 | Kitamura et al. |

(Continued)

FOREIGN PATENT DOCUMENTS

DE 32 05 253 A1 9/1982

(Continued)

OTHER PUBLICATIONS

Novotny et al., "Vector Control and Dynamics of AC Drives", Oxford University Press, pp. 226-255, 257-289 (1996).

(Continued)

*Primary Examiner*—Nicholas Ponomarenko
(74) *Attorney, Agent, or Firm*—Oliff & Berridge, PLC

(57) ABSTRACT

A control apparatus for controlling an exciting current of a field winding type dynamo-electric machine having an exciting winding so as to obtain a demanded output thereof comprises an exciting current detecting circuit being configured to detect an exciting current of the field winding type dynamo-electric machine, a rotation speed detecting circuit being configured to detect a rotation speed of a rotor of the field winding type dynamo-electric machine, an output estimating circuit being configured to estimate an output of the field winding type dynamo-electric machine, an exciting current control circuit being configured to correct the exciting current of the field winding type dynamo-electric machine so as to obtain the demanded output and to supply the corrected exciting current to an exciting winding of the field winding type dynamo-electric machine considering a multi-valued functionality of the output of the field winding type dynamo-electric machine with respect to the exciting current.

41 Claims, 14 Drawing Sheets

U.S. PATENT DOCUMENTS

| | | | |
|---|---|---|---|
| 7,071,656 B2 * | 7/2006 | Taniguchi | 322/28 |
| 7,294,991 B2 * | 11/2007 | Kimura et al. | 322/37 |
| 7,394,227 B2 * | 7/2008 | Uematsu et al. | 322/37 |
| 7,423,351 B2 * | 9/2008 | Maehara | 290/40 C |
| 2003/0178973 A1 | 9/2003 | Maehara | |

FOREIGN PATENT DOCUMENTS

| | | |
|---|---|---|
| DE | 195 32 149 A1 | 3/1997 |
| DE | 100 40 112 A1 | 2/2002 |
| DE | 102 27 821 A1 | 1/2004 |
| JP | A-2003-074388 | 3/2003 |
| JP | A-2003-284257 | 10/2003 |
| JP | A-2004-236408 | 8/2004 |
| JP | A-2005-115932 | 4/2005 |
| WO | WO 88/07287 A1 | 9/1988 |

OTHER PUBLICATIONS

Notice of Preliminary Rejection for KR 10-2007-0049892, Korean Intellectual Property Office, Nov. 27, 2008.

German Office Action for 10 2007 023 650.8-32, German Patent and Trademark Office, Feb. 4, 2009, pp. 1-7.

Boley, C.D. et al.; "Model and Simulations of Hysteresis in Magnetic Cores," IEEE Transactions on Magnetics, vol. 25, No. 5, Sep. 1989, pp. 3922-3924.

Wlodarski, Z. et al.; "Numerical Evaluation of Currents in Circuits with Ferromagnetic Cores on the Basis of Commutation Curve," 9$^{th}$ International Conference on Power Electronics and Motion Control, EPE-PEMC 2000, pp. 5-115 to 5-118.

L. Albert et al.; "Analytic Modelling of Automotive Claw-Pole Alternator for Design and Constrained Optimisation," EPE 2003, Toulouse, pp. 1-8.

E. Etien et al.; "Esrimation of Magnetic Flux at Low Frequencies," EPE 2003, Toulouse, pp. 1-10.

* cited by examiner

E0   NON-LOAD VOLTAGE
φ    ROTOR WINDING FLUX LINKAGE
If   EXCITING CURRENT

OUTPUT CONTROL APPARATUS AND METHOD FOR FIELD WINDING TYPE DYNAMO-ELECTRIC MACHINE

CROSS REFERENCE TO RELATED APPLICATION

The present application relates to and incorporates by reference Japanese Patent Application No. 2006-142841 filed on May, 23, 2006.

BACKGROUND OF THE INVENTION

1. The Field of the Invention

The present invention relates to an output control apparatus and method designed to output a commanded mechanical and/or electrical output of a field winging type dynamo-electric machine or an induction motor by controlling an exciting current thereof, in particular to a control apparatus and method for supplying an appropriate exciting current is supplied to the field winging type dynamo-electric machine or the induction motor so as to obtain the demanded mechanical and/or electrical output. For example, the above mentioned mechanical and/or electrical outputs of the field winging type dynamo-electric machine or an induction motor are a generation torque and an generation electrical current. Furthermore, the present invention relates to an output control apparatus and method designed to output a commanded mechanical and/or electrical output by controlling an exciting current of a field winging type dynamo-electric machine or an induction motor for use in a motor vehicle.

2. Description of the Prior Art

Automotive vehicles have been equipped with electric generators which are rotated and driven by internal combustion engine. Such an electric generator is mounted on a motor vehicle for the purposes of charging the battery, igniting the engine, lighting up the headlights or winkers, and supplying electrical power to other electrical units that consume electrical power (hereinafter referred to as "electric load"). Also, hybrid vehicles have been familiarized lately. In a hybrid vehicle, activation of the motor vehicle is carried out by an electric motor and the internal combustion engine is driven for the purpose of supplying electrical power to the electric motor.

AC generators have widely been known as such generators to be installed in motor vehicles. Alternatively, introduction of field winding type dynamo-electric generators or motors is now underway taking into account the manageability of output control.

An electric generator generates three-phase alternate current in a stator coil provided to a stator upon rotation of a rotor having a field coil. The three-phase alternate current is rectified by a three-phase bridge rectifier formed of six diodes and outputted as direct current.

The generated voltage of the electric generator is in proportion to the rotation speed of the rotor and the magnitude of exciting current that flows through the field coil. The voltage used for charging the battery or supplying electrical power to various electric loads in the motor vehicle is required to be kept at a given level. The electric generators of conventional art have been provided with output control means for controlling the generation voltage by adjusting the exciting current with the aid of a regulator even when the generation voltage is fluctuated by the fluctuation of the rotation speed of the rotor.

The output control means controls the output of the electric generator by effecting the duty ratio of the exciting current under the pulse width modulation control, that is, to adjust the field current to be supplied to the field winding. Specifically, a target value of the generator output is determined according to a value of electrical power demanded by the electric loads and the battery, and then a target value of the field current is also determined according to the target value of the electric generator output, which is followed by the determination on a duty ratio of the exciting current based on the target value of the field current. Then, on-off control of the switching elements is performed so as to realize the duty ratio of the exciting current. More specifically, the deviation between a detected value and the target value of the battery voltage is typically used to effect feedback control for increasing/decreasing the exciting current.

A method and an apparatus for controlling exciting current based on generation torque control have come to be known recently. In this method, exciting current is controlled according to a value of the exciting current that has been calculated based on a demanded generation torque.

Japanese Patent Laid-Open Nos. 2003-074388 and 2003-284257, and U.S. Pat. No. 6,900,618 each discloses a method for controlling exciting current under generation torque control, in which generation torque is calculated by substituting a detected value of the exciting current and a detection value of the rotation speed of the rotor into a map indicating the relation between at least exciting current, the rotation speed of the rotor and generation torque. In this method, the calculated generation torque of the electric generator is transmitted to an ECU (electronic control unit) of the motor vehicle so as to be used for internal combustion engine control, or a generation electric current calculated in the same manner is used for battery control.

An apparatus for controlling exciting current used for a field winding type dynamo-electric machine for motor vehicle includes: an exciting current detection unit for detecting an exciting current of the field winding type dynamo-electric electric machine to output a detection value of the exciting current; a rotation speed detection unit for detecting the rotation speed of the rotor of the field winding type dynamo-electric electric machine to output a detection value of the rotation speed; a power generation torque calculation unit for estimating the generation torque based on a relation of the detection values of the exciting current and the rotation speed of the rotor and based on the detection value of the exciting current to output the detection value of a generation torque; and an exciting current control unit for supplying an exciting current to the field winding, the exciting current corresponding to an exciting current command value that has been calculated based on the estimation value of the generation torque.

The above apparatus for controlling exciting current used for a field winding type dynamo-electric machine for motor vehicle utilizes the above method for controlling exciting current under generation torque control, in which method, reference is made to a table or a map indicating the relation between exciting current, rotation speed of the rotor and generation torque. This method, however, has suffered a problem of low calculation accuracy in the determined exciting current which is calculated based on a command value of the generation torque. This problem has created another problem that not-a-small error can occur between the demanded generation torque or output electric current and the actually generated generation torque or generation electric current.

Meanwhile, vector control method is widely used as a method for controlling generation torque of an induction motor. In this vector control method, a torque generating mechanism of an induction motor is regarded as being an equivalent to a DC motor. In other words, this method enables instantaneous generation torque control based on the orthogonality between secondary flux linkage and torque component current.

U.S. Pat. No. 5,334,923 (Lorenz et al.) discloses a method and an apparatus for indirectly controlling generation torque of an induction machine based on air-gap flux. Specifically, these method and apparatus carry out control of a space angle made between motor flux, such as rotor flux, and generation torque command current to instantaneously effect generation torque control. More specifically, the method and apparatus of Lorenz et al. control vector quantity which is composed of the amplitude and position components of motor flux, such as rotor flux. Thus, according to the method and apparatus of Lorenz et al., measurement is made of the amplitude and the position of motor flux, such as rotor flux. The rotor flux can be calculated from the air-gap flux. In particular, measurement of third harmonics of the air-gap flux may determine the amplitude and the position of the rotor flux with high accuracy. U.S. Pat. No. 5,272,429 (Lipo et al.) discloses a method for calculating third harmonics of air-gap flux based on stator voltage and current. This method calculates a slip gain error based on the amplitude and the position of rotor flux to correct the exciting current required for compensating the requested generation torque.

However, the methods and apparatuses disclosed in the above patent documents are provided on the assumption that there is a linear relation between the generation torque of an induction machine and the generation torque command current. This raises a problem of insufficiency in the accuracy of the generation torque control in case, for example, where the linearity is broken for some reasons. One of the factors that may cause the non-linearity is magnetic saturation or hysteresis characteristics of a magnetization circuit, or else, the fact that a rotating member which is driven by a motor has inertia weight.

SUMMARY OF THE INVENTION

The present invention has been made in consideration of such situations, and it is therefore an object of the invention to provide an exciting current supplying apparatus and method in which an appropriate exciting current for outputting the commanded generation torque is calculated and supplied to the field winging type dynamo-electric machine or the induction motor, in particular for use in a motor vehicle.

According to a main feature of the invention, the exciting current supplying apparatus for use in the field winging type dynamo-electric machine includes an exciting current detecting circuit, a rotation speed detecting circuit, a generation torque calculation circuit, and an exciting current control circuit. The exciting current detecting circuit is designed to measure an exciting current of a flux winding of the field winging type dynamo-electric machine to output the result of the measurement as a detected exciting current value thereof. The rotation speed detecting circuit is designed to detect the rotation speed of the rotor of the field winging type dynamo-electric machine to output the result of the detection as a detected rotation speed. The generation torque calculation circuit is designed to estimate the output generation torque of the dynamo-electric machine by making reference to the predetermined table that contains a relation between at least the detected value of the exciting current, the detected value of the rotation speed, and the output generation torque to output the result of the estimation as an estimated value of the generation torque. The appropriate exciting current to a command value of the generation torque also can be calculated in the generation torque calculation circuit. The exciting current control circuit is designed to supply the exciting current calculated in the generation torque calculation circuit towards the field winging type dynamo-electric machine so as to obtain the command generator torque. In the exciting current controlling and supplying apparatus designed and constructed as above, it is preferable that the generation torque calculation circuit can calculate the output generation torque of the dynamo-electric machine from at least the detected value of the exciting current and the detected value of the revolution speed considering multi-valued dependency of the output generation torque on the exciting current.

BRIEF DESCRIPTION OF THE DRAWINGS

Other objects and the features of the present invention will become more apparent from the following detailed description of the preferred embodiment taken in conjunction with the accompanying drawings in which.

DETAILED DESCRIPTION OF THE PREFERRED EMBODIMENTS

Various embodiments of the present invention will now be described hereafter with references to accompanying drawings.

The present invention is applicable to all field winging type dynamo-electric machines. However, for present disclosure purpose, three-phase field winging type dynamo-electric machine are described.

Referring to FIGS. 1 to 11, a description will given hereinbelow of an output control apparatus for field winging type dynamo-electric machine, in particular for use in a motor vehicle according to the first embodiment of the present invention.

Figure 1:
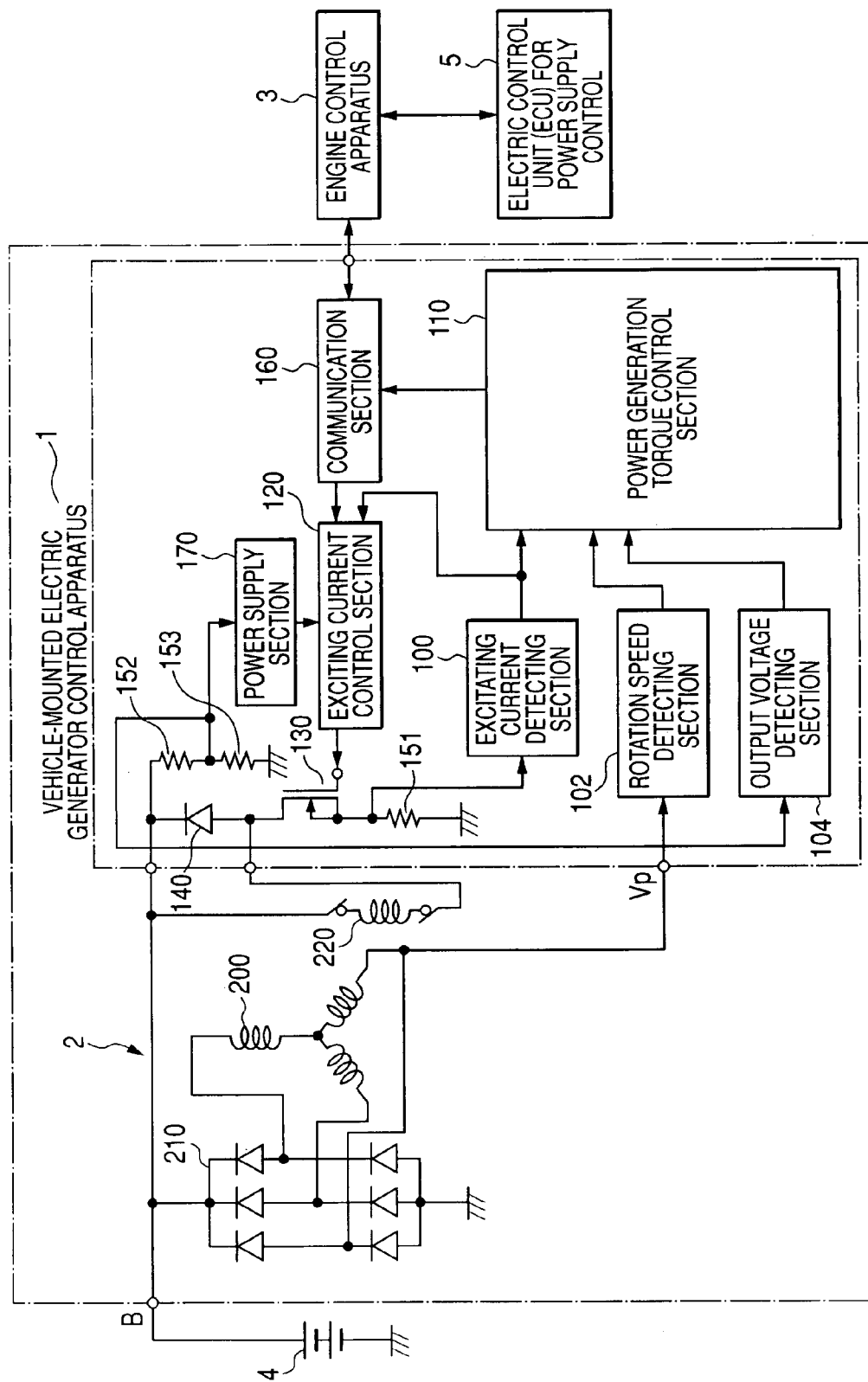
FIG. 1 shows a block diagram illustrating an arrangement of an exciting current control apparatus for use in the field winging type dynamo-electric machine according to the first embodiment of the present invention.

FIG. 1 is a block diagram illustrating an output control system of a field winding type dynamo-electric machine for use in a motor vehicle.

An output control apparatus 1, in particular for use in a motor vehicle, according to the first embodiment of the present invention (referred to as an exciting current control apparatus in the present invention) is connected to an AC generator 2, in particular for use in a motor vehicle, (referred to as a field winding type dynamo-electric machine for use in a motor vehicle in the present invention), and an engine control apparatus 3. Furthermore, the AC generator 2 is connected to a battery 4 and the engine control apparatus 3 is connected to a power management ECU 5. The engine control apparatus 3 determines a torque command value through communication with the power management ECU 5 or the like and sends it to the power generation control apparatus for use in a motor vehicle 1.

The power generation control apparatus for use in a motor vehicle 1 supplies generation current it generated to the battery 4 and receives the torque command value from the engine control apparatus 3. In addition, it detects exciting current, a rotation speed and output voltage of the AC generator for use in a motor vehicle 2. The power generation control apparatus for use in a motor vehicle 1 has a function of controlling output voltage of the AC generator for use in a motor vehicle 2 to a predetermined adjustment voltage set value (i.e., 14V), and controlling generation torque of the AC generator for use in a motor vehicle 2 to the torque command value from the engine control apparatus 3. Specifically, the power generation control apparatus for use in a motor vehicle 1 further carries out computation of a generation torque estimation value and computation of generation current, and controls the magnitude of exciting current to be delivered to a field coil 220 based on the computed torque estimation value and the received torque command value.

The AC generator for use in a motor vehicle 2 includes a three-phase rotor coil 200, a three-phase full-wave rectifier 210, and a field coil 220.

Induced alternate current output is supplied to the three-phase full-wave rectifier 210. The rectifier 210 is a full-wave rectifier circuit that rectifies alternate current output of the rotor coil 200 to direct current output. The field coil 220 generates field by flowing exciting current for the purpose of generating linkage magnetic flux for inducing voltage to the rotor coil 200.

The engine control apparatus 3 calculates an exciting current command value for exciting current of the AC generator for use in a motor vehicle 2 based on the torque estimation value inputted from a torque control section 110 through a communication section 160 and battery voltage (or battery SOC may also be acceptable) inputted from the power management ECU 5.

The basic of calculation of the exciting current command value is carried out as a known feedback control for increasing and decreasing exciting current If so as to eliminate a difference between the torque command value computed by the engine control apparatus 3 and the received torque estimation value. Of course, magnitude of battery voltage and generation current is also taken into consideration for computation of the torque command value. This enables decreasing the exciting current command value if battery voltage is high, and increasing the exciting current command value if battery voltage is low. There are various variations in the exciting current feedback control itself using the torque estimation value.

The power generation control apparatus for use in a motor vehicle 1 includes an exciting current detection section 100, a rotation speed detection section 102, an output voltage detection section 104, a generation torque control section 110, an exciting current control section 120, a power transistor 130, a free-wheel diode 140, resistance elements 151 to 153, a communication section 160, and a power circuit 170.

The exciting current detection section 100 detects exciting current that flows in the field coil 220 based on voltage drop of the resistance element for current detection 151 connected between the ground and a source terminal of the power transistor 130 configured by an N-channel MOSFET, and outputs it as an exciting current detection value.

Figure 7:
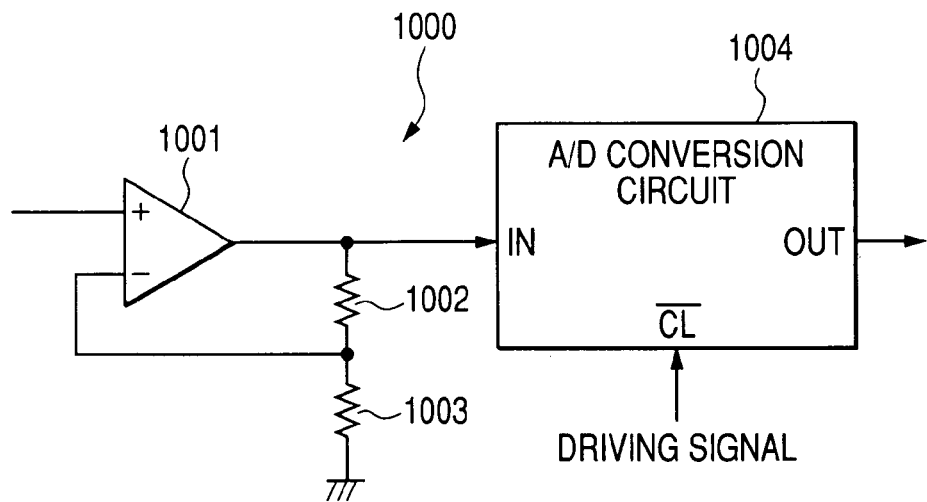
FIG. 7 is an illustration of a detailed arrangement of a revolution speed detecting circuit according to the first embodiment of the present invention shown in FIG. 1.

FIG. 7 is an illustration of an exciting current detection circuit 1000 of the exciting current detection section 100. As shown in FIG. 7, the exciting current detection circuit 1000 includes a computation amplification circuit 1001, resistances 1002 and 1003, and an A/D converting circuit 1004. An amplifier having an amplification factor determined by the two resistances 1002 and 1003 is configured by the computation amplification circuit 1001 and the two resistances 1002 and 1003. The amplifier amplifies input voltage having a value corresponding to exciting current and outputs the amplified voltage. The A/D converting circuit 1004 receives an output signal from the amplifier at an input terminal and a drive signal, not shown, at a clock terminal (CL) in a negative logic, takes in the output voltage of the amplifier as described before at a timing when the drive signal shifts from a high level to a low level, and converts it to digital data containing information on the exciting current value. The digital data is outputted to the generation torque control section 110.

The rotation speed detection section 102 detects the rotation speed based on a frequency of a one-phase voltage of the rotor coil 200. A phase voltage Vp of the rotor coil 200 takes a waveform with 50% duty ratio and the frequency being proportional to the rotation speed of the AC generator for use in a motor vehicle 2. Accordingly, after binarizing the phase voltage Vp, the rotation speed detection section 102 counts the number of pulses per unit hour and outputs it as the rotation speed detection value to the generation torque and generation current computation section 110.

The rotation speed detection section 102 may be configured to compute not only the rotation speed but also a time variable component of the rotation speed, that is, rotational acceleration.

Figure 8:
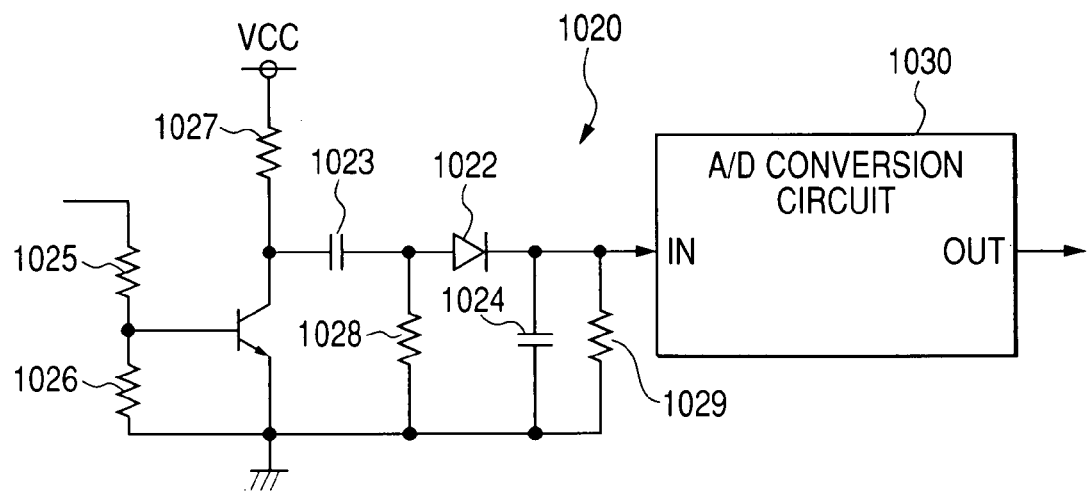
FIG. 8 is an illustration of a detailed arrangement of an exciting current detecting circuit according to the first embodiment of the present invention shown in FIG. 1.

FIG. 8 is an illustration of a rotation speed detection circuit 1020 configuring the rotation speed detection section. As shown in FIG. 8, the rotation speed detection circuit 1020 includes a transistor 1021, a diode 1022, capacitors 1023 and 1024, resistances 1025 to 1029, and an A/D converting circuit 1030.

Either one of the phase voltages of the rotor coil 200 is divided by a dividing circuit configured by the resistances 1025, 1026, and applied to the base of the transistor 1021. A waveform rectifier circuit is configured by the transistor 1021 and the resistance 1027 connected to the corrector side thereof. A signal made by shaping the phase voltage waveform is outputted from the collector of the transistor 1021. The output is inputted to a differentiation circuit configured by the capacitor 1023 and the resistance 1028, and the differentiated output is rectified by the diode 1022. Next, it is inputted to a charge and discharge circuit configured by the capacitor 1024 and the resistance 1029. These configurations enable generating voltage proportional to the frequency of the phase voltage of the rotor coil 200, and inputting it to the A/D converting circuit 1030. The A/D converting circuit 1030 converts the input voltage to digital data. The digital data is outputted to the generation torque and generation current computation section 110.

The output voltage detection section 104 converts the output voltage of the AC generator for use in a motor vehicle 2 detected based on partial voltage of the output voltage of the AC generator for use in a motor vehicle 2 divided by a resistance dividing circuit configured by the resistance elements 152, 153 to a digital signal, and outputs it to the generation torque computation section 110 as an output voltage detection value.

The output voltage detection section 104 may be a voltmeter capable of outputting the result as a digital signal, or may be combination of an analog voltmeter and an A/D converter.

As shown in FIG. 9A, the generation torque control section 110 includes an exciting current correction section 110a, a generation torque computation section 110b, and a motion point restoration operation section 110c. The exciting current correction section 110a has an exciting current correction function, the generation torque computation section 110b has a generation torque estimation function, and the motion point restoration operation section 110c has a motion point restoration operation function to be described later. The exciting current correction section 110a includes a torque map.

Figure 10:
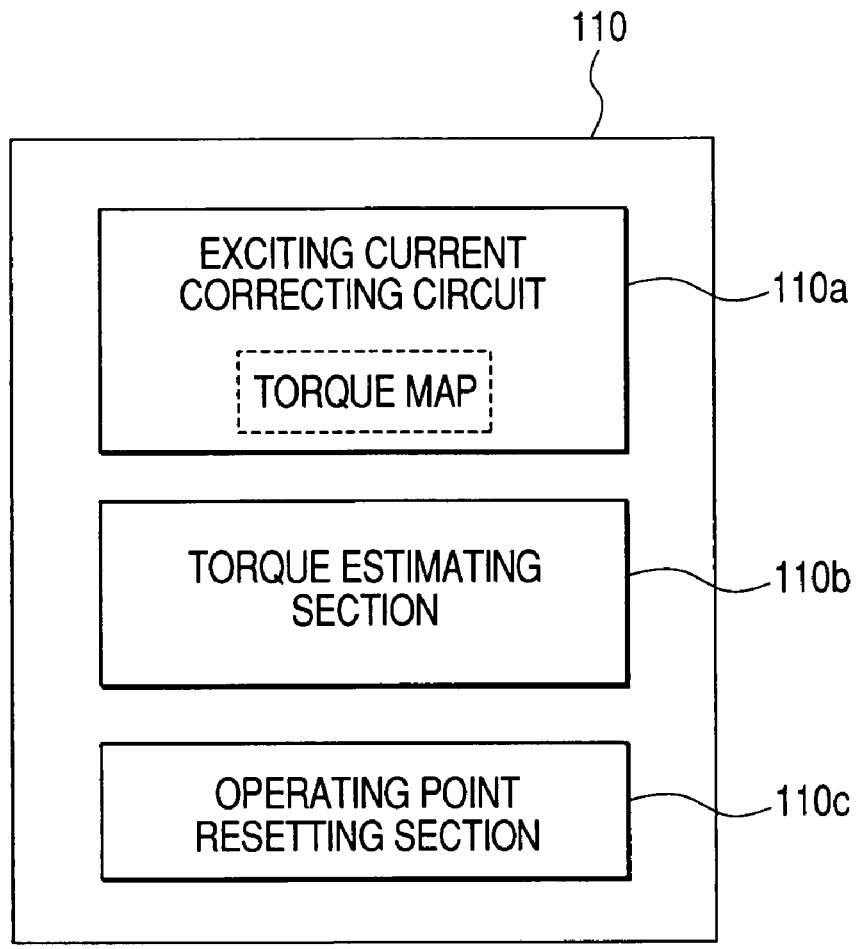
FIG. 10 shows block diagrams illustrating an arrangement of a generation torque calculation circuit according to the present invention shown in FIG. 1.
Figure 11:
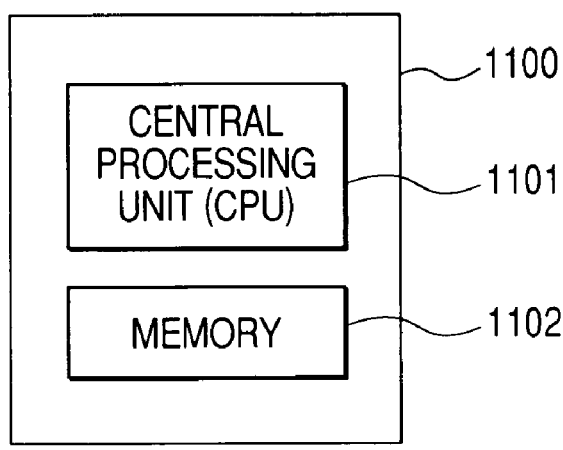
FIG. 11 shows another block diagrams illustrating an arrangement of a generation torque calculation circuit according to the first embodiment of the present invention shown in FIG. 1.
Figure 12:
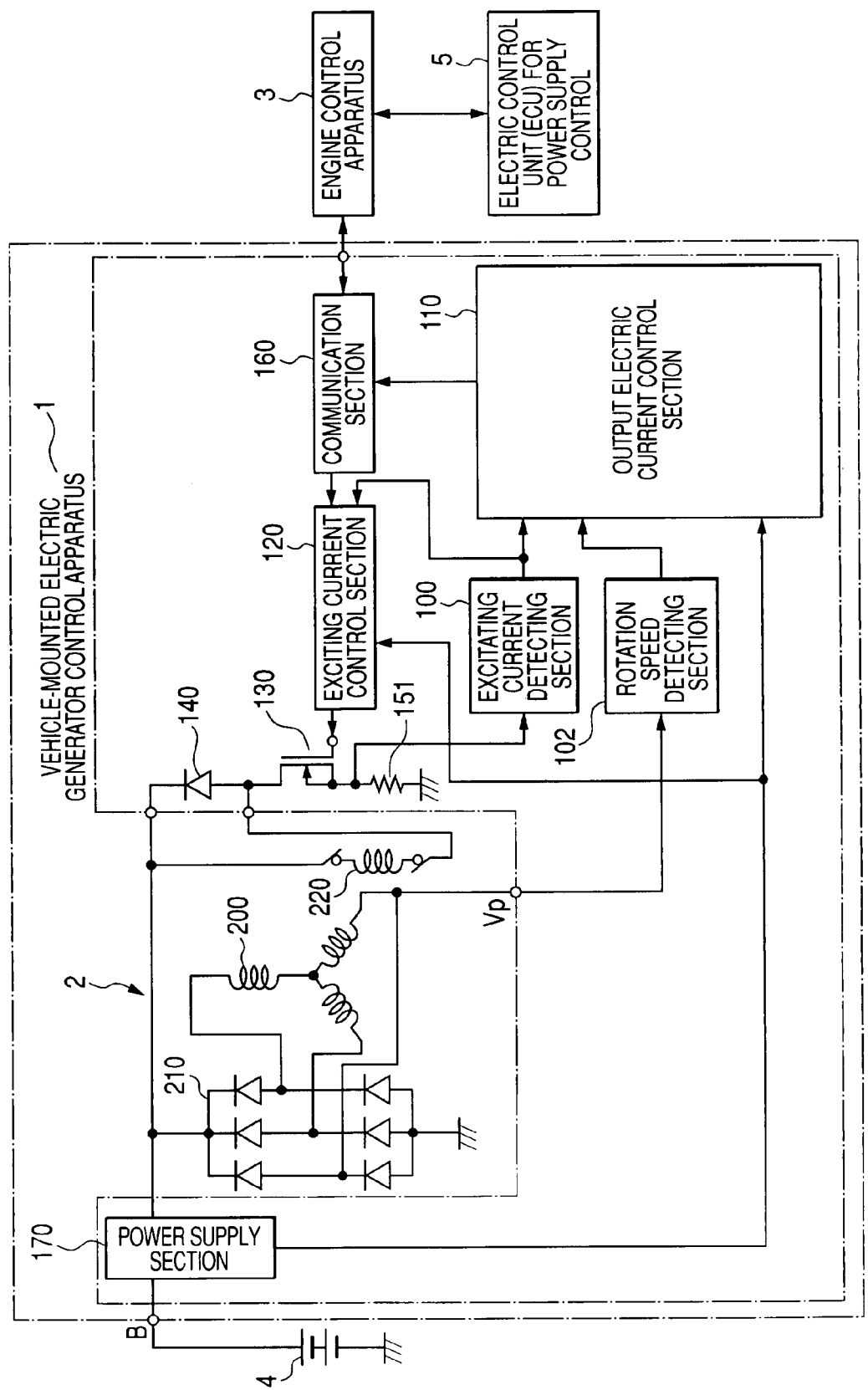
FIG. 12 shows a block diagram illustrating an arrangement of an exciting current control apparatus for use in the field winging type dynamo-electric machine according to the second embodiment of the present invention.

As shown in FIG. 10, the generation torque control section 110 is configured by at least a CPU 1101 and a memory 1102. In addition to the torque map showing the relation of exciting current, rotation speed and output voltage with respect to generation torque, the memory 1102 stores a computer program serving an exciting current correction function, a computer program serving a generation torque estimation function, and a program carrying out a motion point restoration operation.

In one example, correction of exciting current corrects the exciting current detection value detected by the exciting current detection section 100, and computes a corrected exciting current value to be used for generation torque and generation current computation as an input parameter. Alternatively, correction of exciting current and generation torque computation may be integrally processed.

Computation of the corrected exciting current value is a computation for correcting a torque estimation error caused by hysteresis characteristics of a magnetic material that configures a magnetic circuit of the field coil 220. The computation is carried out to the inputted exciting current detection value to determine the corrected exciting current value, and the corrected exciting current value is used by the generation torque control section 110 to determine the torque estimation value.

In generation torque estimation, a torque estimation value is computed based on, for example, the corrected exciting current value, the rotation speed detection value and the output voltage detection value. For example, the generation torque control section 110 stores the torque maps showing the relation of exciting current, rotation speed and output voltage with respect to generation torque in advance, and computes the torque estimation value by substituting the corrected exciting current value and the rotation speed detection value to the maps.

The exciting current control section 120 intermittently controls the exciting current-driven transistor 130 in accordance with the exciting current command value received from the engine control apparatus 3 via the communication section 160.

Figure 9:
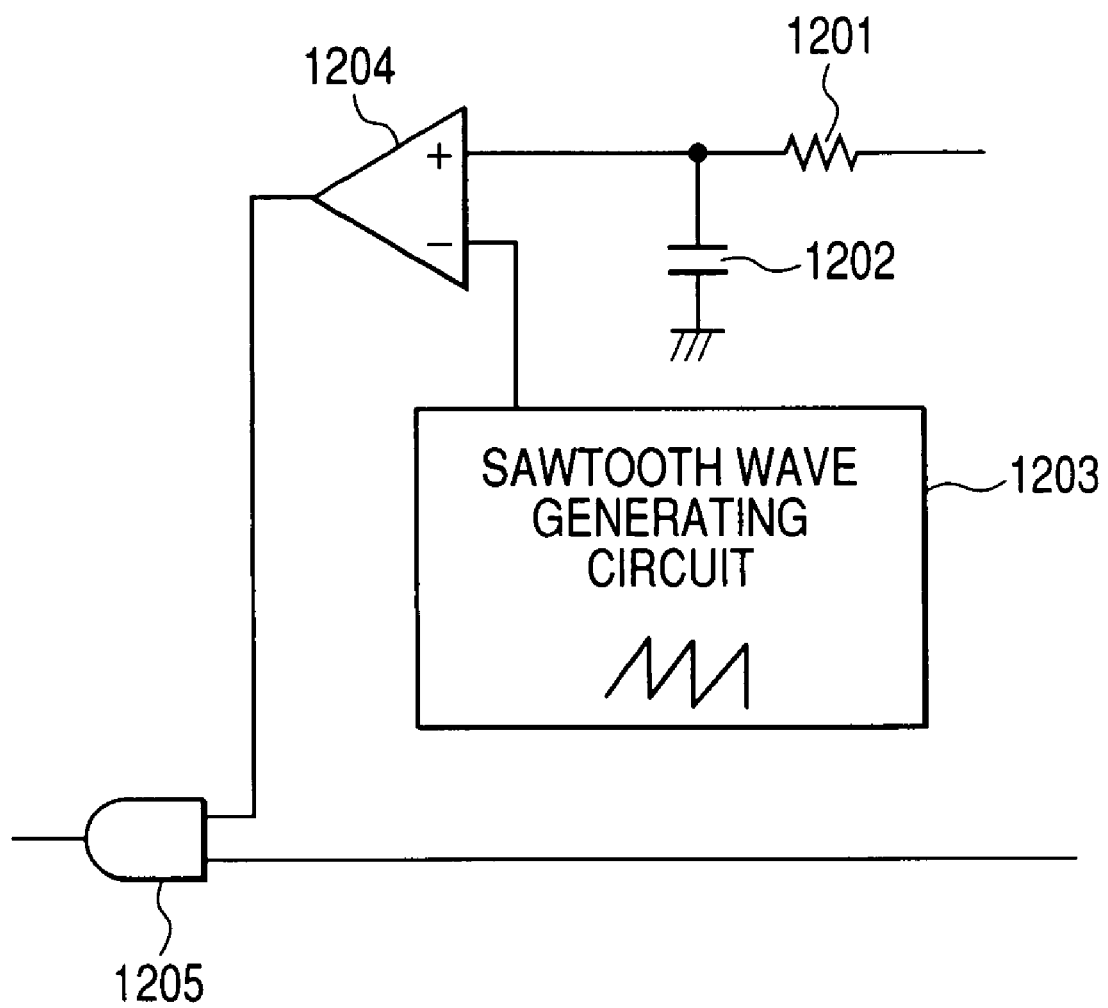
FIG. 9 is an illustration of a detailed arrangement of an exciting current control circuit according to the first embodiment of the present invention shown in FIG. 1.

FIG. 9 illustrates an exciting current control circuit 1200 that configures the exciting current control section. As shown in FIG. 10, the exciting current control circuit 1200 includes a resistance 1201, a capacitor 1202, a sawtooth waveform generation circuit 1203, a voltage comparator 1204, and an AND circuit 1205. A smoothing circuit is configured by the resistance 1201 and the capacitor 1202. The signal outputted from the communication section 160 is inputted into a plus terminal of the voltage comparator 1204. A sawtooth waveform signal outputted from the sawtooth waveform generation circuit 1203 is inputted to a minus terminal of the voltage comparator 1204. The voltage comparator 1204 compares smoothed input inputted to the plus terminal and the sawtooth waveform signal inputted to the minus terminal, thereby outputting a PWM signal having a corresponding duty ratio to the AND circuit 1205.

Meanwhile, the output voltage AC of the generator for use in a motor vehicle 2 detected based on the divided voltage of the output voltage AC of the generator for use in a motor vehicle 2 divided by the resistance dividing circuit configured by the resistance elements 152, 153 is converted into an appropriate operational voltage in the power circuit 170, and inputted to the exciting current control circuit 120. Next, it is inputted to the AND circuit 1205.

The AND circuit 1205 receives the PWM signal and the operational voltage from the power circuit 1206. Next, it outputs a drive signal which is equivalent to logical AND of these to the power transistor 130.

The power transistor 130 is connected with the field coil 220 in series, and flows exciting current to the field coil 220 when it is in an ON state. The resistance 151 which is equivalent to a sense resistance for detecting exciting current is connected to a source side of the power transistor 130. Exciting current is detected by the exciting current detection section 100 based on terminal voltage of the resistance 151 that is generated when exciting current flows in the field coil 220 via between the source and drain of the power transistor 130 and via the resistance 151.

The free-wheel diode 140, connected with the field coil 220 in parallel, refluxes exciting current when the power transistor 130 is in the OFF state.

The communication section 160 transmits the torque estimation value obtained by the generation torque computation section 110 to the engine control apparatus 3, and transmits the exciting current command value obtained by the engine control apparatus 3 to the exciting current control section 120. It is needless to say that the communication section 160 has a communication protocol for sending and receiving these data, and converts a data format suitable for data receipt at the destination.

Specific Example 1 of Correction of Exciting Current

The specific example 1 of correction of exciting current will now be explained referring to FIG. 2.

The correction of exciting current substantially corrects an error $\Delta If=Ifm-If$ between the exciting current detection value If and a memory creation exciting current Ifm which was used when creating the above described torque map and an generation current map. The error $\Delta If$ is generated due to hysteresis characteristics of a magnetic material configuring a magnetic circuit in which field flux flows. Generation of the error $\Delta If$ caused by hysteresis characteristics will be hereafter explained.

Figure 2:
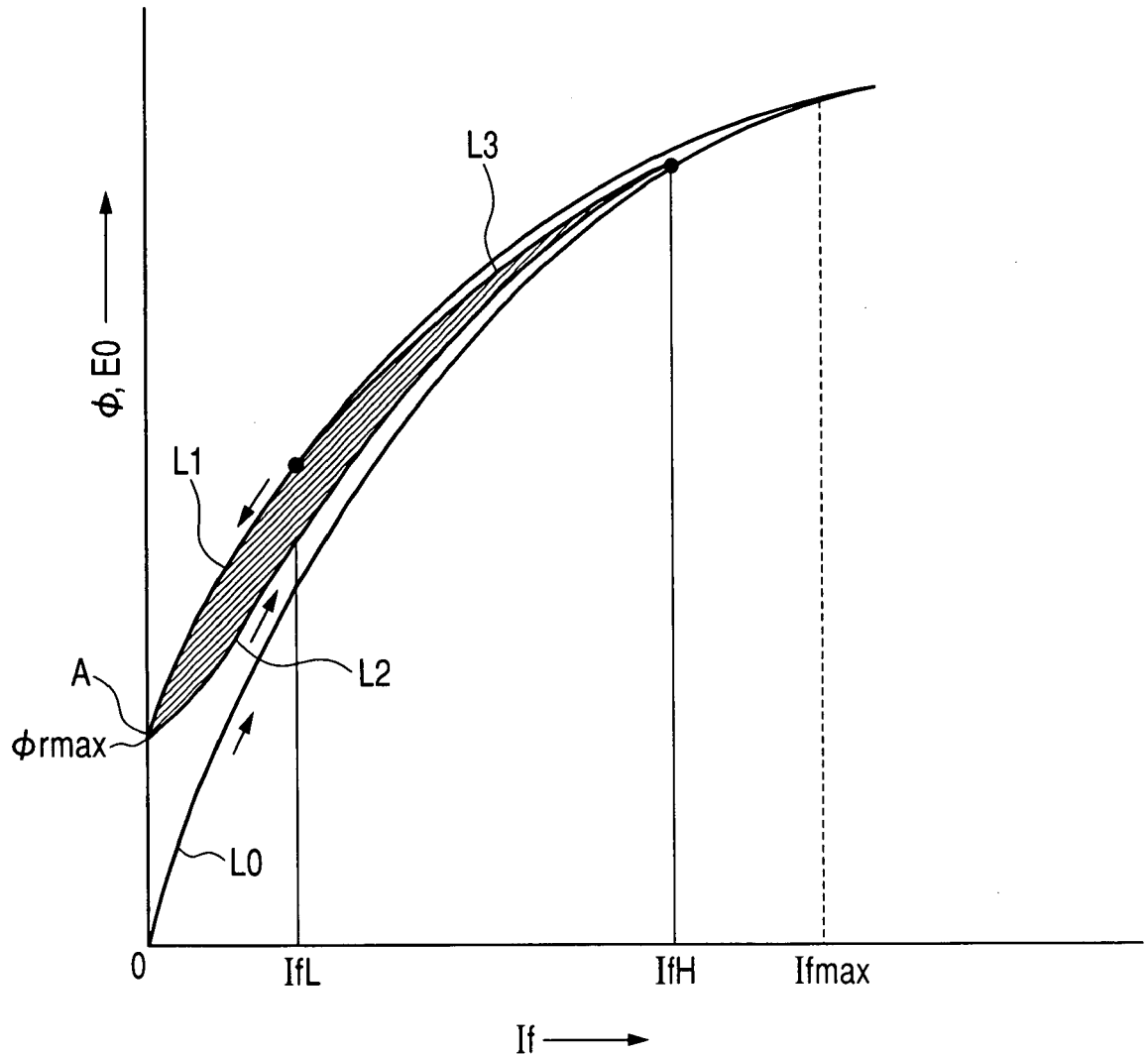
FIG. 2 is a graph of magnetization curves showing a relation between an exciting current of an iron-core which is a member included in the field winging circuit and magnetic flux linkage of armature winding.

FIG. 2 is an illustration of exciting current and an rotor coil linkage magnetic flux amount (also referred to as a stator coil linkage magnetic flux) $\phi$. As well known, the rotor coil linkage magnetic flux amount is proportional to no-load voltage Eo of the rotor coil. FIG. 2 shows only the first quadrant. L0 represents an initial magnetization characteristic line (also referred to as an initial rising curve), L1 represents a characteristic line when dropping from the magnetic saturation state (referred to as a saturation and decrease characteristic line), and L2 represents a characteristic line in the case where excitation is carried out from a point where excitation 0 state is achieved from L1 (the maximum residual magnetization state). $\phi rmax$ is the maximum residual magnetic flux amount.

In this embodiment, at shipment, a large amount of current is delivered to the field coil 220 to magnetically saturate field magnetic circuit before shipment. Also after this, current is delivered to the transistor 130 with duty ratio 100% at a preferable timing at least for several seconds (for a certain time constant or more) so as to regularly restore the field magnetic circuit to a substantial magnetic saturation state. It is preferable that the forcing magnetic saturation operation be carried out immediately after the engine starts or when load current is large. In addition, it be preferably carried out in a state where the battery voltage is low and SOC of the battery is small to absorb increase in generation current caused by increase in the exciting current value If. In addition, it is preferably that it be carried out in the state where the engine rotation speed is low because increase in generation current is smaller. This arrangement enables the motion point in the non-excitation state in the iron core of the field magnetic circuit as shown in FIG. 2 to return to the coordinate point A (If=0, $\phi rmax$). This motion point restoration operation will be described later referring to FIG. 6.

The restoration energization which is carried out in an appropriate operation environment or regularly enables the characteristics of the field magnetic circuit when current decreases subsequently to return to the characteristic line L1. As a result of this, if the torque map (hereinafter referred to as a second map) created on the basis of the relation of the characteristic line L1 has been stored in advance, the error $\Delta If$ will not be generated by using the second map when the exciting current If monotonically decreases from the exciting current Ifmax. Furthermore, if the torque map and the generation current map created on the basis of the relation of the characteristic line L2 (hereinafter, referred to as a first map) has been stored in advance, the error $\Delta If$ will not be generated in the case where exciting current monotonically increases from the exciting current If=0.

Note that, for data collection for creating these maps, a map created at an ambient temperature close to the temperature in the engine room, for example, at an ambient temperature 90° C.

Hereinafter, details of correction of exciting current will be explained by classifying the motion points of the dynamo-electric machine in FIG. 2 into three cases.

(Case 1)

Because of restoration of the above described coordinate point A, after power generation has started, the motion point rises from the coordinate point A along the characteristic line L2. According to the measured result, the characteristic line L2 approaches the initial magnetization characteristic line L0 as exciting current If increases. If the value equals to a certain exciting current value IfH or more, the line is regarded as the substantially initial magnetization characteristic line L0, and thus no major error is generated.

In other words, during operation, the exciting current If starts monotonically increasing from the coordinate point A, and when it exceeds the exciting current value IfH, the characteristic line L2 can be regarded as identical with the characteristic line L0. Accordingly, if the exciting current If equals to the exciting current IfH or more, it can be reckoned that no error is generated caused by torque estimation and generation current estimation using the first map based on the characteristic line L2.

In other words, in the present embodiment, the characteristic line L2 is employed as the memory creation exciting current Ifm to be used when creating the above described first map. In the operation state of Case 1 (when the exciting current monotonically increases from If=0), and after the exciting current value has become IfH or more, torque estimation error is calculated using the first map on the basis of the characteristic line L2. This arrangement can reduce the error considerably.

(Case 2)

Next, when the exciting current If decreases from the state where it can be regarded that exciting current If =exciting current Ifmax, the rotor coil linkage magnetic flux amount $\phi$ decreases along the characteristic line L1. In addition, in the case where the exciting current If decreases from the state where IfH to Ifmax, the exciting current value If decreases along the characteristic line L3, and if the value equals to a certain exciting current value IfL or less, it is regarded as the substantial characteristic line L1, and thus no major error is generated.

In other words, during operation, in the case where the exciting current If monotonically decrease from the state where the exciting current value is IfH to Ifmax, if the value is less than the exciting current value IfL, it can be regarded that the characteristic line L3 is identical with the characteristic line L1. Accordingly, if the exciting current If equals to the exciting current IfL or less, it can be reckoned that no error is generated caused by torque estimation using the second map on the basis of the characteristic line L1 or the characteristic line L3.

In other words, in the present embodiment, the characteristic line L1 is employed as the memory creation exciting current Ifm to be used when creating the above described first map, and in the operation state of Case 2 (when the exciting current monotonically decreases from If=Ifmax), or in the case where the exciting current If monotonically decreases from IfH to Ifmax to less than IfL, torque estimation error is computated using the second map on the basis of the characteristic line L1. This arrangement can reduce the error considerably.

(Case 3)

In an operation state other than the above described Case 1 or Case 2 (in the case of Case 3), the motion points exist in a diagonal line area shown in FIG. 2. In the present embodiment, the exciting current detection values If which has been detected are substituted to the above described first map and the second map respectively to determine the first torque estimation value and the generation current estimation value, and the second torque estimation value. Next, the average of these is computed to determine the average value of the torque estimation values. This arrangement can reduce hysteresis error in generation torque estimation.

Specific Example 2 of Correction of Exciting Current

Specific example 2 of correction of exciting current will be explained. In the specific example 2, the characteristic lines L2 and L3 have been stored in advance. In Case 3, torque estimation is carried out by determining two rotor coil linkage magnetic flux amounts φ by substituting the exciting current detection value If to the characteristic lines L2 and L3, substituting the average magnetic flux values of these to the characteristic line L2 to determine the corrected exciting current value, and substituting the corrected exciting current value to the above described first map. Note that torque estimation may be carried out by substituting the above described average magnetic flux value to the characteristic line L3 to determine the corrected exciting current value, and substituting the corrected exciting current value to the above described second map.

Specific Example 3 of Correction of Exciting Current

Specific example 3 of correction of exciting current will be explained. In the specific example 3, whether the immediately preceding exciting current tends to increase or tends to decrease in the above described specific example 2 has been determined based on the history of the immediately preceding exciting current detection value.

Next, when it tends to increase, torque estimation is carried out in Case 3 by determining two rotor coil linkage magnetic flux amounts φ by substituting the exciting current detection value If to the characteristic lines L2 and L3, determining the corrected exciting current value by substituting a value determined by subtracting a predetermined value Δφ from the average magnetic flux value of these to the characteristic line L2, and substituting the corrected exciting current value to the above described first map.

Next, when it tends to decrease, torque estimation is carried out in Case 3 by determining two rotor coil linkage magnetic flux amounts φ by substituting the exciting current detection value If to the characteristic lines L2 and L3, determining the corrected exciting current value by substituting a value determined by adding a predetermined value Δφ to the average magnetic flux value of these to the characteristic line L3, and substituting the corrected exciting current value to the above described second map.

Specific Control Example 1

Hereinafter, a specific control example will be explained with reference to a flowchart shown in FIG. 3.

First, at Step 100, a rotation speed detection value N and an output voltage detection value V are read in. The revolutions detection value N is obtained by the rotation speed detection section 102. The output voltage detection value is obtained by the output voltage detection section 104.

At Step 102, the exciting current detection value If is read in. The exciting current detection value If is obtained by the exciting current detection section 100.

At Step 104, the exciting current detection value If which has been read is corrected to the corrected exciting current value If'.

Next, at Step 106, a torque estimation value is determined by substituting If', N and V to the torque map showing the relation among the exciting current detection value If, the rotation speed detection value N, the output voltage detection value V and the generation torque T. The torque map is stored in the exciting current correction section 110a.

Next, at Step 108, exciting current is controlled using the torque estimation value which was determined and the exciting current control section 120. A feedback control is widely used as a control algorithm.

Computation Example 1 of the Corrected Exciting Current Value If'

Next, computation of the corrected exciting current value If' described in Step S104 will be hereinafter explained with reference to FIG. 4.

As described previously, in Case 1, since the magnetization characteristic line L2 to be stored in advance is identical with the motion points, a command to select the torque map corresponding to the magnetization characteristic line L2 is provided. In Case 2, since the magnetization characteristic line L1 to be stored in advance is identical with the motion points, a command to select the torque map corresponding to the magnetization characteristic line L1 is provided.

Figure 4:
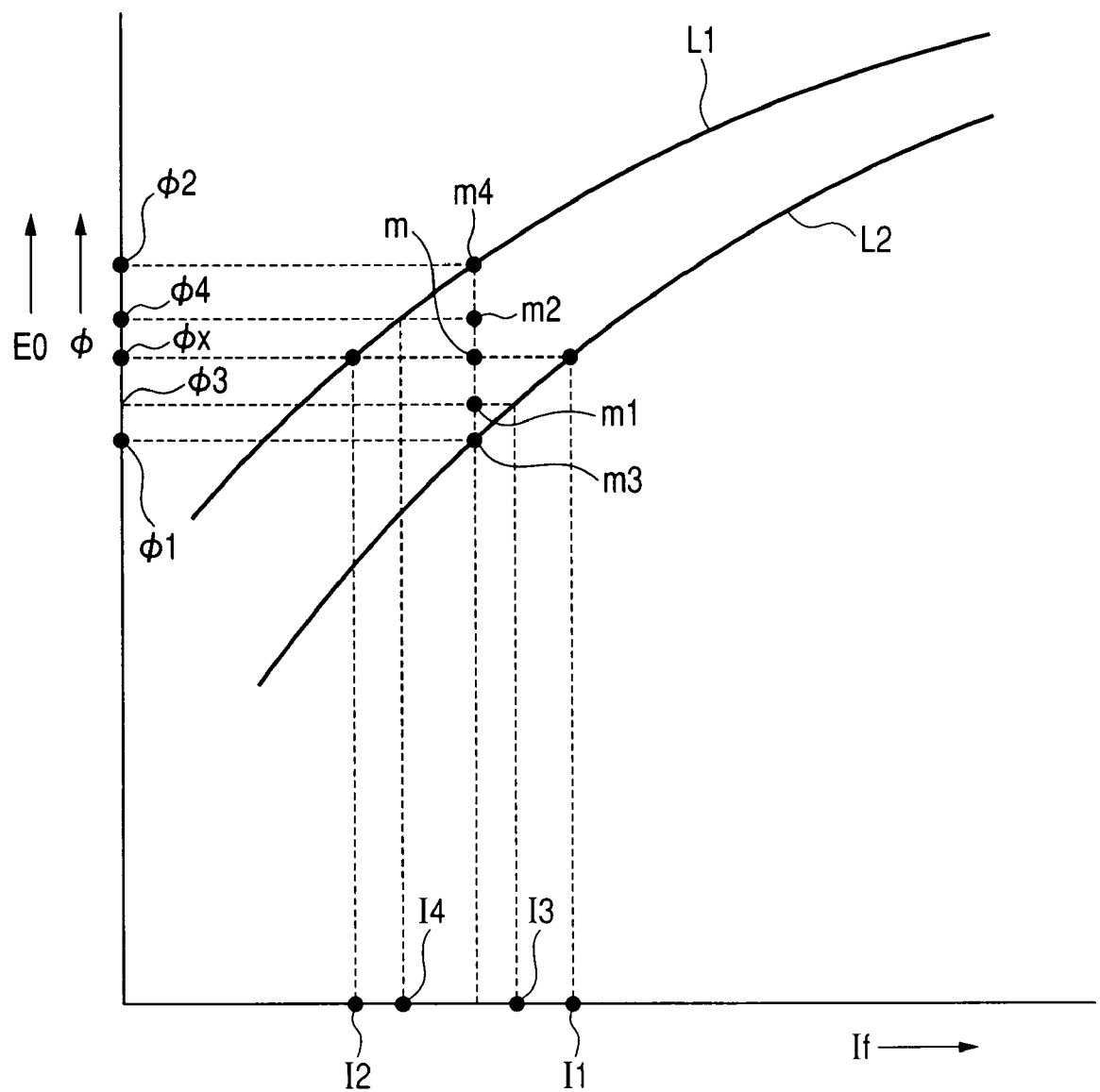
FIG. 4 is an example of calculation of a corrected value of the exciting current.

In Case 3, the motion points exist between the magnetization characteristic lines L1 and L2 as shown in FIG. 4. Accordingly, in this example, magnetization characterization which is at the intermediate between the magnetization characteristic lines L1 and L2 is assumed, and the rotor coil linkage magnetic flux amount φx (=(φ1+φ2)/2) for the intermediate magnetization characterization is assumed. All that is required is to input exciting current corresponding to the rotor coil linkage magnetic flux amount φx to the map. In the case where the magnetization characteristic line L2 is used, the corrected exciting current value I1 is determined by substituting φx to the magnetization characteristic line L2. In this case, torque estimation may be carried out by substituting the corrected exciting current value I1 to the torque map based on the magnetization characteristic line L2 at Step S106.

Note that in the case where the magnetization characteristic line L1 is used in torque estimation, the corrected exciting current value I2 is determined by substituting φx to the magnetization characteristic line L1. In this case, torque estimation may be carried out by substituting the corrected exciting current value I2 to the torque map based on the magnetization characteristic line L1 at Step S106.

Computation Example 2 of the Corrected Exciting Current Value If'

A second method for computing the corrected exciting current value If' described in Step S104 will be hereinafter explained with reference to FIG. 4.

In the above described computation example 1, I1 or I2 is determined as the corrected exciting current value If' on the assumption that the motion points are located midway between the magnetization characteristic line L1 and the magnetization characteristic line L2. However, in the case where the exciting current tends to increase, the motion points are closer to the magnetization characteristic line L2 than L1, and in the case where the exciting current tends to decrease, the motion points are closer to the magnetization characteristic line L1 than L2.

Next, in the case where the exciting current tends to increase in FIG. 4, the motion point is set to be at the intermediate m1 between a point m3 and an intermediate point m on the magnetization characteristic line L2. Since the magnetization characteristic line L2 is used in torque estimation, the corrected exciting current value I3 is determined by substituting φ3 to the magnetization characteristic line L2. In this case, at Step S106, torque estimation may be performed by substituting the corrected exciting current value I3 to the torque map based on the magnetization characteristic line L2.

In addition, in the case where the exciting current tends to decrease in FIG. 4, the motion point is set to be at the intermediate m2 between a point m4 and an intermediate point m on the magnetization characteristic line L2. Since the magnetization characteristic line L1 is used in torque estimation, the corrected exciting current value I4 is determined by substituting φ4 to the magnetization characteristic line L1. In this case, at Step S106, torque estimation may be performed by substituting the corrected exciting current value I4 to the torque map based on the magnetization characteristic line L1.

(Restoration of Motion Points)

Figure 6:
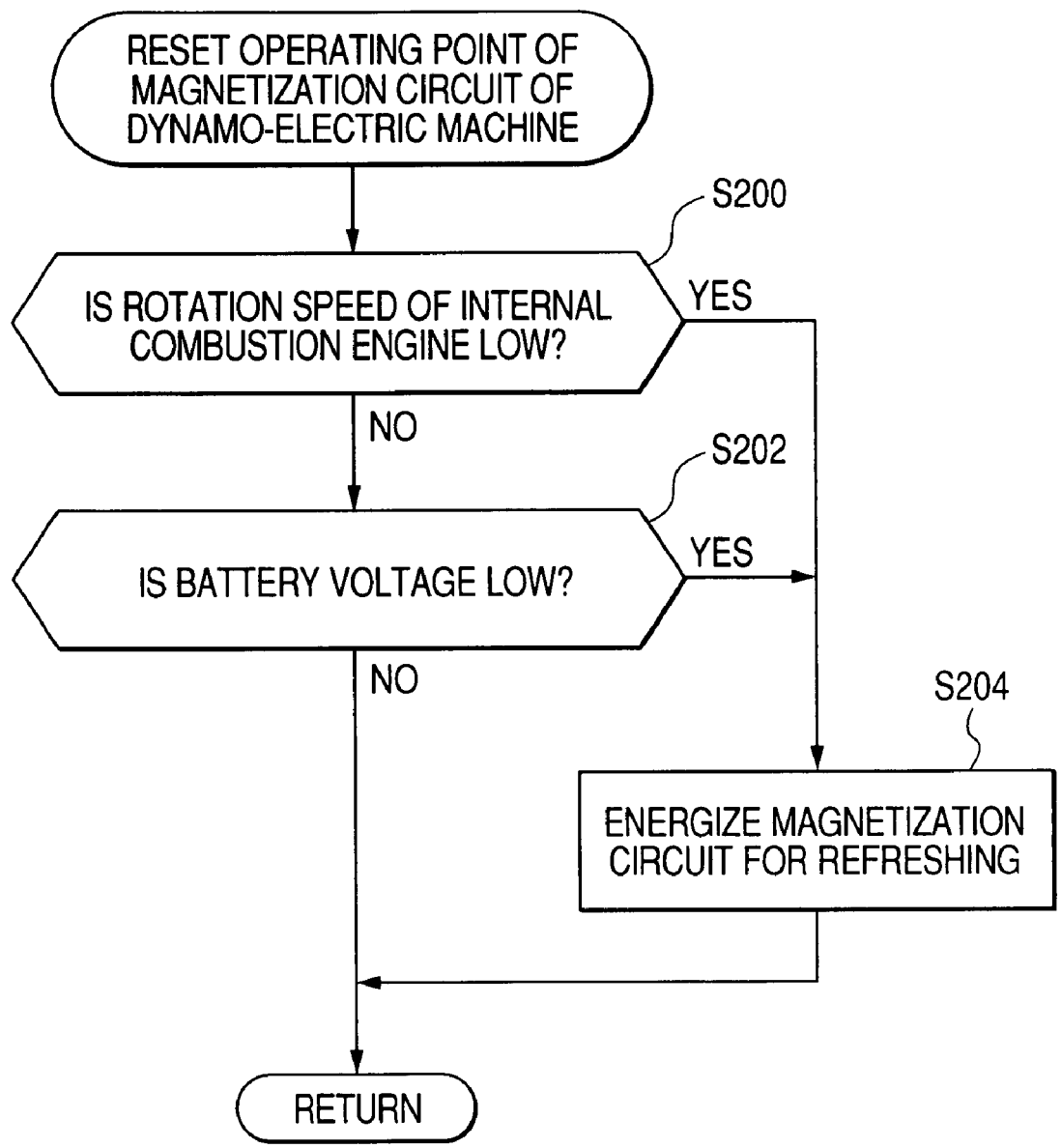
FIG. 6 is a flow chart illustrating a recovery operation of the operating point of the magnetization curves showing a relation between an exciting current of an iron-core and magnetic flux linkage of armature winding.

An example of the motion point restoration operation will be explained with reference to a flowchart shown in FIG. 6.

First, at Step 200, it is examined whether the engine rotation speed equals to a predetermined value or less. The engine rotation speed is detected by the rotation speed detection section 102. If the value equals to a predetermined value or less, the routine advances to Step 204, if the value exceeds a predetermined value the routine advances to Step 202.

At Step 202, it is examined whether the battery voltage equals to a predetermined value or less. The battery voltage is measured by a power circuit section 170, and sent to motion point restoration section 110c of the generation torque control section 110. If the value equals to a predetermined value or less the routine advances to Step S204.

At Step S204, current with 100% duty ratio is applied to the field coil 220 for several seconds or more. More specifically, the motion point restoration section 110c of the generation torque control section 110 that received the engine rotation speed from the rotation speed detection section 102 and the battery voltage from the power circuit section 170 gives a command to the exciting current control section 120 via the communication section 160 to apply current with 100% duty ratio for several seconds or more. This enables the motion point in the non-excitation state in the iron core of the field circuit to return to the coordinate point A (If=0, φmax) in FIG. 2.

Modification Embodiment

Computation may be carried out by estimating a current coordinate point based on a past current history in a two dimensional space having the exciting current and the rotor coil linkage magnetic flux amount as the respective coordinate axes, and correcting the deviation between the rotor coil linkage magnetic flux amount of the above described current coordinate point and the rotor coil linkage magnetic flux amount corresponding to the detected exciting current value in the relation between the exciting current and the rotor coil linkage magnetic flux amount which is the basis of the relation (map) between the exciting current which has been stored in the memory in advance and the generation torque. For example, an exciting current value corresponding to the rotor coil linkage magnetic flux amount φ of the above described current coordinate point may be determined and substituted to the above described memory for torque estimation.

As a result of this, an AC generator for use in an engine and a motor vehicle can be controlled with high accuracy on the generation torque basis. For example, since excess torque value of the engine can be regenerated during deceleration of a vehicle, deterioration of drivability caused by rapid regeneration can be prevented and amount of regeneration can be increased. In addition, a generation torque of the AC generator for use in a motor vehicle is controlled in high precision toward engine torque fluctuation that causes vehicular vibration while the engine is idling in the direction of canceling the engine torque fluctuation, whereby engine torque fluctuation is reduce. As a result of this, low idling can be achieved and higher fuel economy can be achieved.

Modification Embodiment

Figure 3:
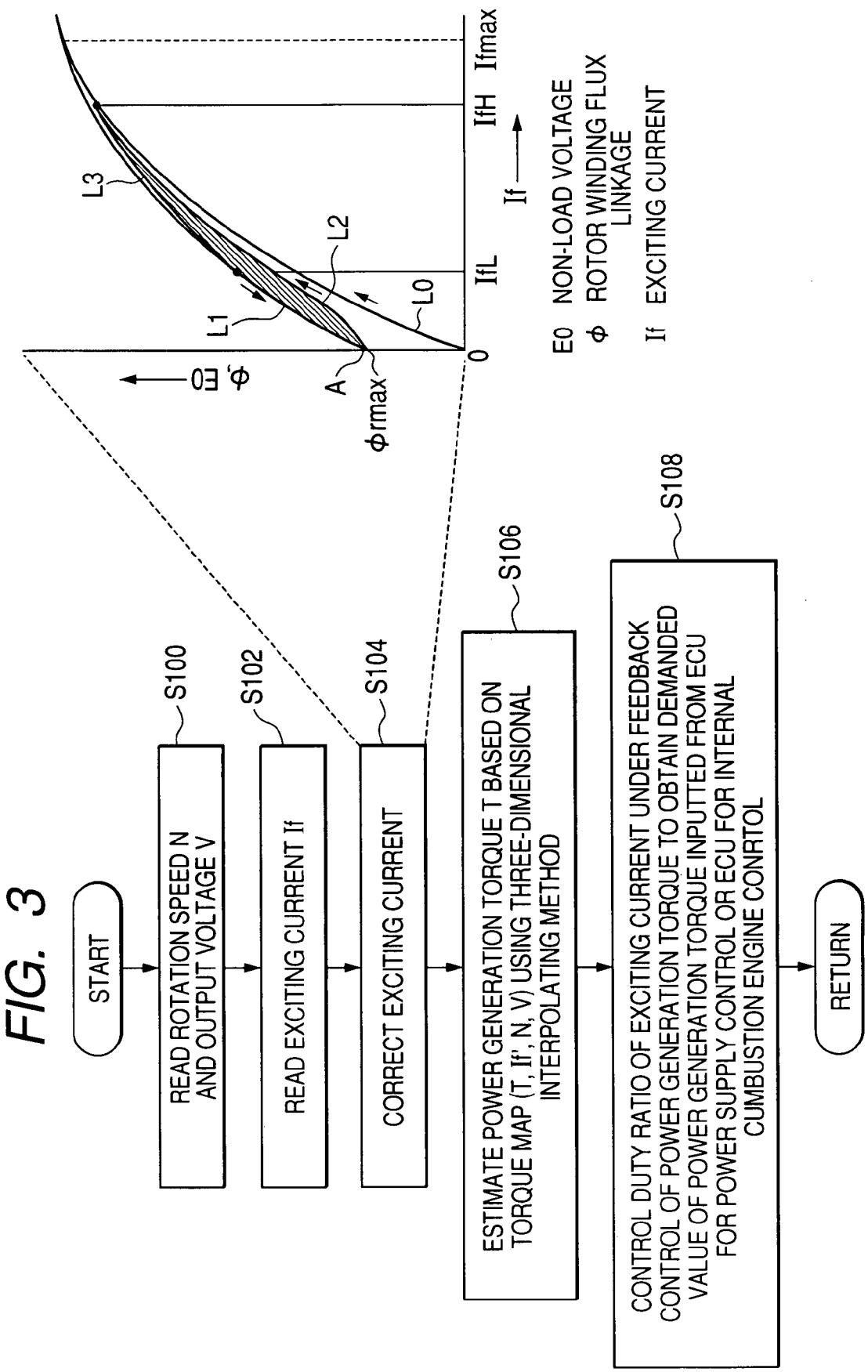
FIG. 3 is a flow chart illustrating an operational procedure of the generation torque control apparatus according to the first embodiment of the present invention.

At Step 108 in FIG. 3, when exciting current is supplied to the demanded generation torque, a vector control as described in Chapter 6 of D. W. Novotny and T. A. Lipo, Vector Control and Dynamics of AC Device (Oxford univ. press, 1996) may be used. Since the vector control method controls both the amplitude and phase of alternate current, it is called as vector control.

Generally speaking, in a vector control, hysteresis of the magnetic circuit is not taken into consideration, and the rotor coil linkage magnetic flux amount is not a multiple-valued function. Use of the method as described above also enables hysteresis of the magnetic circuit to be taken into consideration hysteresis of the magnetic circuit even in the vector control.

By doing so, generation torque estimation precision can be considerably increased compared to a conventional art. Accordingly, a generation torque control-type exciting current control with high accuracy can be realized.

Modification Embodiment

Note that the present invention is not limited to the above described embodiments, and various modifications within the scope of the summary of the present invention can be implemented.

Figure 5:
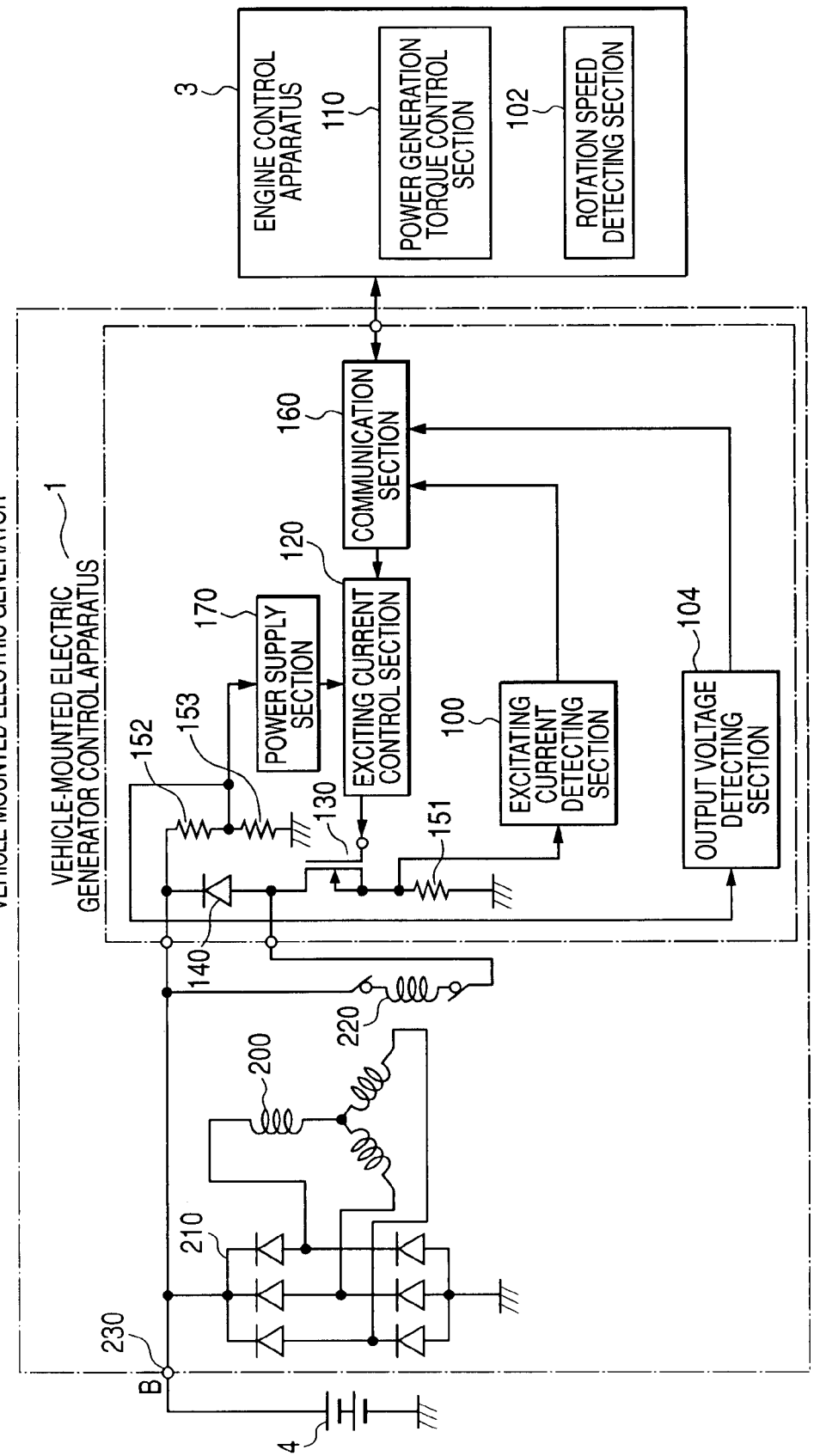
FIG. 5 shows a block diagram illustrating an arrangement of an exciting current control apparatus for use in the field winging type dynamo-electric machine according to the modification of the first embodiment of the present invention.

One of modification examples will be explained with reference to FIG. 5. In the first embodiment, the generation torque control section 110 is provided in the power generation control apparatus for use in a motor vehicle 1. The generation torque control section 110 may be carried out in the engine control apparatus 3 as shown in FIG. 6A.

In addition, in the first embodiment, the rotation speed detection section of the AC generator for use in a motor vehicle is provided in the power generation control apparatus for use in a motor vehicle 1. Instead, as shown in FIG. 6, it may be provided in the engine control apparatus 3 so as to detect the rotation speed of the AC generator for use in a motor vehicle 2 from the detected engine rotation speed and the pulley ratio between the engine and the AC generator for use in a motor vehicle 2.

Furthermore, the power generation control apparatus for use in a motor vehicle 1 may compute an exciting current command value based on a torque command value received from the engine control apparatus 3 and a torque estimation value computed by itself.

The effect of the first embodiment in the present invention is described.

As is seen in the foregoing, the first embodiment in the present invention is characterized in that the torque estimation section has a function to compensate nonlinearity between exciting current and generation torque. Particularly, it is characterized in that the section has a function to compensate that generation torque is a multiple-valued function of exciting current.

Hysteresis is often observed in a physical system where output is a multiple-valued function to input.

Phenomena accompanied with hysteresis are defined as the phenomena that the system does not promptly respond to a force inputted to the physical system. In other words, it is defined as a phenomenon such that the state of a system at a moment depends upon a state just before the system changes.

In a method and an apparatus of controlling a torque-controlled exciting current in the present invention, a high accuracy torque estimation can be performed by compensating that generation torque is a multiple-valued function of exciting current.

Particularly, the present invention is characterized in that the torque estimation section performs operations to reduce errors in the torque estimation values caused by hysteresis characteristics. Such a step allows a high accuracy torque-controlled exciting current control to be realized because torque estimation accuracy can be more largely improved than the conventional art.

In the conventional torque-controlled exciting current control, generation torque is estimated by assigning detected data such as exciting current to a map showing the relation between exciting current and rotation speed, further preferably between output voltage and generation torque. However, this map was prepared with initial magnetization characteristics of a field magnetic circuit as the criteria. However, as is well known, because a soft magnetic material configuring the field magnetic circuit has hysteresis characteristics (also referred to as "direct current hysteresis characteristics"), the operating point deviates from the initial magnetization characteristics as it vary with exciting current, as a result, a relation between generation torque and exciting current may vary. Namely, this is because torque estimated errors in the torque-controlled exciting current control are resulted from the hysteresis characteristics of the field magnetic circuit.

This is because the estimated torque errors occur by allowing the relation between exciting current and armature winding flux linkage quantity that is a basis in the map to deviate from the state when the values are written in the map stored in the memory by the so-called hysteresis characteristics. This allows estimated torque errors to be reduced if this deviation is lessened.

For example, generation torque can be estimated in high accuracy by finding an exciting current error ($\Delta If$) between an operation exciting current and an exciting current detected value in the relation between an operation exciting current and non-load saturation voltage stored for the operation of generation torque to perform processing such as compensation of exciting current detected value by adding the exciting current error ($\Delta If$) to the exciting current detected value.

In a preferable embodiment, the torque estimation section stores exciting current incremental time magnetization characteristics and exciting current decremental time magnetization characteristics as magnetization characteristics of the field magnetic circuit showing the relation between the exciting current substantially used for the torque estimation and armature winding flux linkage quantity equivalent and selects the poloidal characteristics substantially used for the torque estimation, based on the operational conditions of the vehicle field wire-wound motor.

Namely, in the embodiment, attention is paid to a fact that the magnetization characteristics (hysteresis characteristics) of the field magnetic circuit largely varies with exciting current incremental time and exciting current decremental time, any one of exciting current incremental time magnetization characteristics and exciting current decremental time magnetization characteristics is selected, based on operational conditions (for example, change trend just before exciting current). Preferably, a torque estimation map is selected based on exciting current incremental time magnetization characteristics when exciting current is increased and a torque estimation map is selected based on exciting current decremental time magnetization characteristics when exciting current is decreased. Such a step allows a torque estimation accuracy to be more largely improved than the conventional art.

In a preferable embodiment, the torque estimation section judges whether a change trend just before the exciting current is a current incremental trend or a current decremental trend, in the case of the current incremental trend, it estimates a generation torque by substantially using magnetization characteristics closer to the exciting current incremental time magnetization characteristics than the exciting current decremental time magnetization characteristics and in the case of the current decremental trend, it estimates a generation torque by substantially using magnetization characteristics closer to the exciting current decremental time magnetization characteristics than the exciting current incremental time magnetization characteristics.

Namely, in the embodiment, when the exciting current is increased, it estimates a generation torque using a torque estimation map corresponding to magnetization characteristics closer to exciting current incremental magnetization characteristics than exciting current decremental time magnetization characteristics in place of an excitement current incremental time magnetization characteristics per se that is prestored, when an exciting current is decreased, it estimates a generation torque using a torque estimation map corresponding to magnetization characteristics closer to exciting current decremental magnetization characteristics than exciting current incremental time magnetization characteristics in place of an excitement current decremental time magnetization characteristics per se that is prestored. Such a step allows a torque estimation accuracy to be more largely improved than the conventional art.

In a preferable embodiment, the torque estimation section selects the torque estimation substantially using intermediate magnetization characteristics of the poloidal characteristics, based on the operational conditions of the vehicle field wire-wound motor. Preferably, in operational conditions (case 3 later described) where an operating point is highly likely to deviate from prestored magnetization characteristics in a dimensional space showing the relation between the exciting current and the armature winding flux linkage quantity, it estimates a generation torque, based on a map corresponding to intermediate magnetization characteristics between the exciting current incremental time magnetization characteristics and the exciting current decremental time magnetization characteristics. Even in this case, it is preferable that the torque estimation section estimates a generation torque in a map corresponding to magnetization characteristics more or less closer to the exciting current incremental time magnetization characteristics when the exciting current is increased, and it is preferable that the section estimates a generation torque in a map corresponding to magnetization characteristics more or less closer to the exciting current decremental time magnetization characteristics when the exciting current is decreased.

In a preferable embodiment, the exciting current decremental time magnetization characteristics is the magnetization characteristics (L1) when the exciting current is simply decreased after it substantially reaches a magnetic saturation state. A generation torque estimation error can be decreased because the exciting current decremental time magnetization characteristics can be allowed to match with the magnetization characteristics by performing almost magnetic saturation processing on the field magnetic circuit.

In a preferable embodiment, the exciting current decremental time magnetization characteristics is the magnetization characteristics (L2) when the exciting current is simply decreased after the exciting current is simply decreased from a substantially magnetic saturation state to reach the state of the exciting current zero. A torque estimation error can be reduced because the exciting current incremental time magnetization characteristics can be allowed to match with the magnetization characteristics by performing almost magnetic saturation processing on the field magnetic circuit.

If further described, a hysteresis loop enclosed by the characteristic curves L1 and L2 (see FIG. 2) is very narrow, and the distance between the operating point present inside and the characteristic curve L1 or L2 is considerably smaller than the distance between the operating point and the initial magnetization characteristics L0, further, a torque estimation error can be largely improved because the operating point can be returned onto the characteristic curves L1 and L2 as necessary or periodically by the magnetic saturation processing afore-mentioned.

In a preferable embodiment, magnetic saturation processing is performed on the field magnetic circuit by conducting the exciting current of predetermined value or more for a predetermined time. This allows the operating point to be started on the magnetization characteristics L2. Thereafter, the operating point can be present inside the hysteresis loop (the space between the magnetization characteristics L1 and L2 shown in the slash in FIG. 2) enclosed by the magnetization characteristics L1 and L2 (see FIG. 2). As a result, an estimated error can be reduced if a generation torque is estimated with magnetization characteristics L1 and L2 as the standards.

In a preferable embodiment, the exciting current is conducted by a sufficient quantity and time to almost magnetically saturate the field magnetic circuit at a predetermined timing. This allows the operating point to be started on magnetization L2 at a predetermined timing. Thereafter, the operating point can be present inside the hysteresis loop (the space between the magnetization characteristics L1 and L2 shown in the slash in FIG. 2) enclosed by the magnetization characteristics L1 and L2 (see FIG. 2). As a result, an estimated error can be reduced if a generation torque is estimated with magnetization characteristics L1 and L2 as the standards.

In a preferable embodiment, the exciting current is conducted when an engine is stopped. This does not allow a big generation current to be generated even if a big exciting current is conducted to recover the residual magnetic flux, and the processing can't be a problem.

In a preferable embodiment, the exciting current is conducted when the rotation speed of the engine is a predetermined value or less. This does not allow a big generation current to be generated even if a big exciting current is conducted to recover the residual magnetic flux, and the processing can't be a problem.

In a preferable embodiment, the exciting current is conducted if the storage state of a battery to which an electric power is supplied from the vehicle field wire-wound motor is a predetermined value or less. Even if this causes a big generation current to be generated to recover the residual magnetic flux, a problem may not occur because the generation current can be effectively utilized to charge the battery.

In addition, in a preferable embodiment, the generation torque control section issues a command to supply an exciting current corresponding to a demanded generation torque by a vector control.

Generally, in the vector control, the hysteresis of a magnetic circuit is not considered, the armature winding flux linkage quantity is not the multiple-valued function of an exciting current. The hysteresis of the magnetic circuit can be considered even in the vector control by selecting any one of exciting current incremental time magnetization characteristics and exciting current decremental time magnetization characteristics. Because such a step allows a torque estimation accuracy to be more largely improved than the conventional art, a high accuracy-torque-controlled exciting current control can be realized.

In addition, a high accuracy torque-controlled exciting current control can be realized by estimating and using not only a multivalent property of a relation between exciting current and generation torque derived from the hysteresis characteristics of a field magnetic circuit but also the exciting current dependency of an optimum generation torque in response to operational conditions.

In addition, in a vehicle motor, a rotor has an inertia moment. It may be considered by adding the inertia torque derived from the inertia moment.

In this case, in the rotation speed detecting device 102, not only the rotation speed but also the time-varying component of the rotation speed, i.e., a revolution acceleration is calculated. And, the inertia moment value of a motor is stored in the generation torque control section 10, and the inertia torque in a transition state of the motor can be calculated by using the value.

Because such a step allow a torque estimation accuracy to be more largely improved than the conventional art, a high accuracy torque-controlled exciting current control can be realized.

In the embodiment, the excitation is compensated in the generation torque estimation, based on the exciting current in the torque-controlled vehicle AC motor exciting current controller. However, a similar compensation may be applied to a vehicle AC dynamo-electric machine or a vehicle dynamo-electric machine.

(Effect)

According to the embodiment as described above, in the torque estimation using the exciting current detected value, the relation between the exciting current detected value and generation torque is compensated to a relation different from these relations at the time of forming a map, and this allows a torque estimation error by hysteresis characteristics to be reduced.

Namely, because the map showing the relation between the exciting current and generation torque in response to the operational conditions of the vehicle AC dynamo-electric machine 2 is substantially changed to a direction where the hysteresis error is lessened, the torque estimation error by the hysteresis characteristics to be reduced.

In addition, according to the embodiment, because the field magnetic circuit of the vehicle AC dynamo-electric machine is almost magnetically saturated by increasing the exciting current at an appropriate timing (for example, just before or just after engine stop), a change in the relation between the exciting current and generation torque derived from the displacement of the operating point caused by the hysteresis characteristics can be well compensated. Further, according to the first embodiment in the present invention, a similar effect can be exerted because it is magnetically saturated before shipment likewise.

In addition, according to the first embodiment in the present invention, because a plurality of the relations (map) between the exciting current and generation torque are substantially stored, one of those is selected or an intermediate value of those is operated in response to the operational conditions of the vehicle AC dynamo-electric machine 2, a change in the relation between the exciting current and generation torque derived from the displacement of the operating point by the hysteresis characteristics can be well compensated.

Second Embodiment

A second embodiment is described using FIGS. 14, 2, 4, 4, 6-9, 11-13.

In addition, in the descriptions of the exciting current controller and the method therefor of the embodiment, for the same configuration as in the components described in the first embodiment, the same symbols are used to omit or simplify these descriptions.

In the second embodiment, the exciting current controller so as to realize a demanded generation current in high accuracy is disclosed. The exciting current controller so as to realize such an accurate dynamo-electric machine current is, for example, used to charge a battery neither too much nor too little. In addition, in the vehicle drive controller capable of stably performing generation torque control in a combination of a dynamo-electric machine and an AC motor as disclosed in the Japanese Patent Application Laid-open No. 2005-115932, a accurate motor control is possible.

Figure 14:
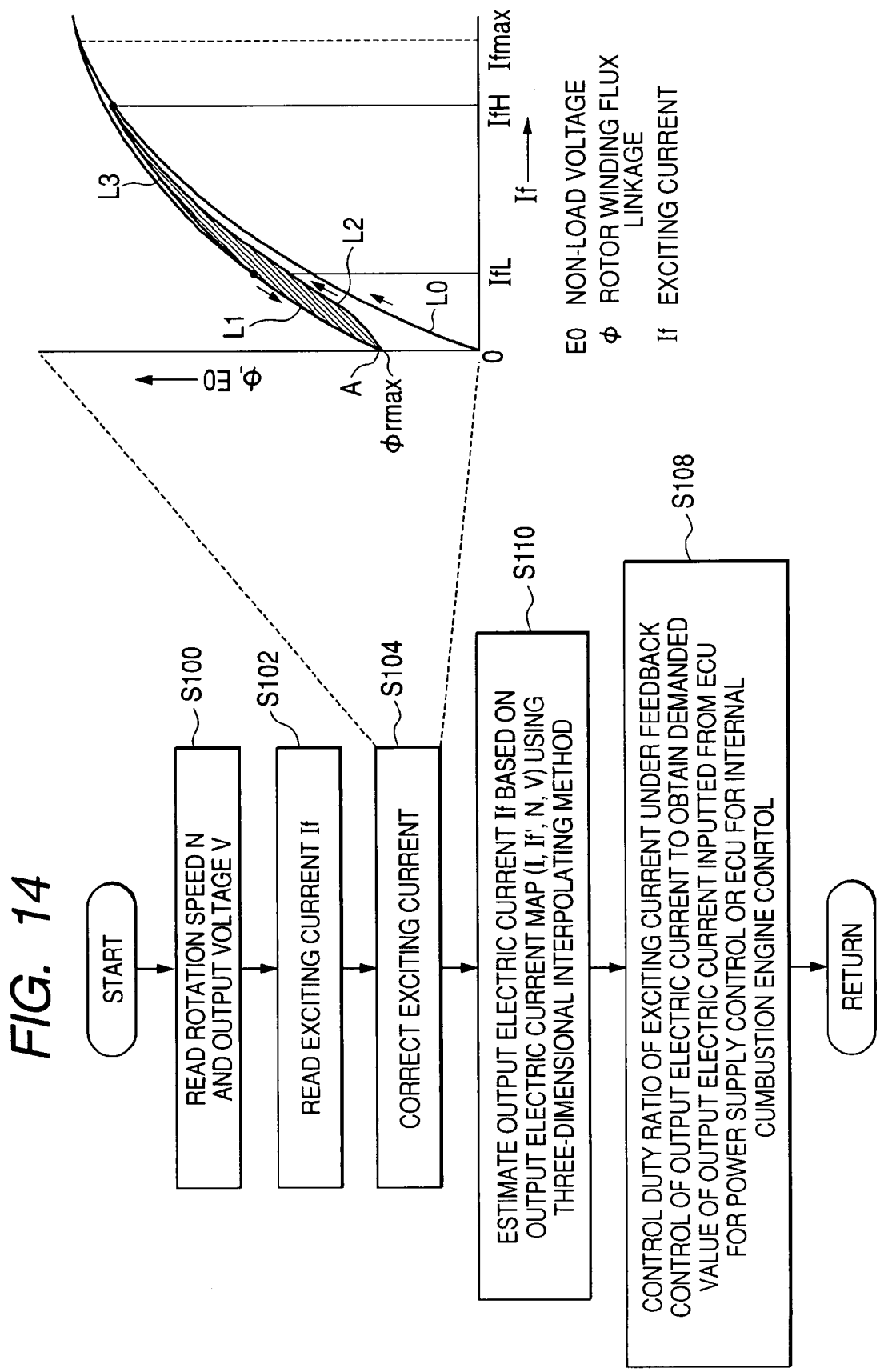
FIG. 14 is a flow chart illustrating an operational procedure of the exciting current control apparatus according to the second embodiment of the present invention.

As shown in FIG. 14, the vehicle generation controller 1 in the embodiment is provided with the exciting current detection section 100, the rotation speed detection section 102, the output voltage detection section 104, the generation current control section 110A, the exciting current control section 120, the power transistor 130, the reflux diode 140, the resistive element 151, the communication section 160, and a power supply circuit 170A.

In the second embodiment, the generation current control section 110A is provided in place of the generation torque control section 110 of the first embodiment.

Figure 13:
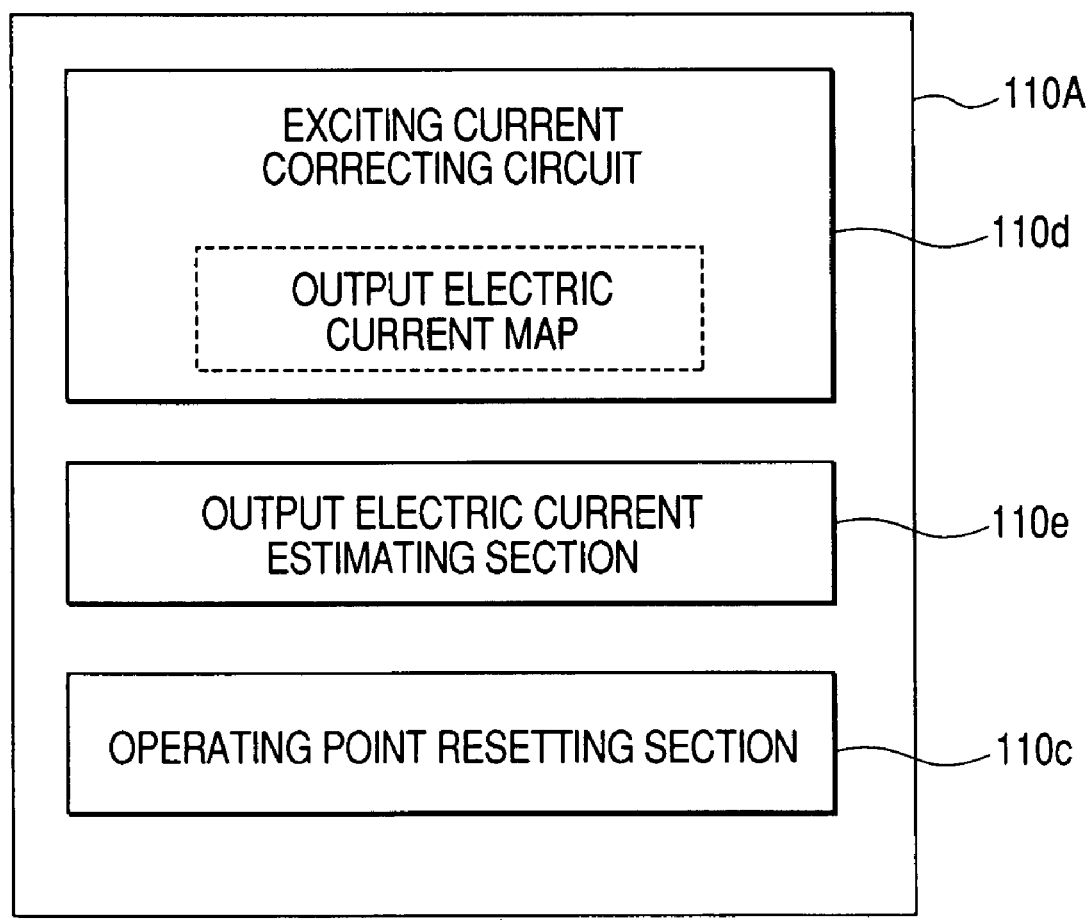
FIG. 13 shows block diagrams illustrating an arrangement of a generation torque calculation circuit according to the second embodiment of the present invention shown in FIG. 12.

As shown in FIG. 13, the output control section 110A is provided with the exciting current compensation section 110d, the generation current operation section 110e, and the operating point recovery control section 110c.

The exciting current compensation section 110d is provided with an generation current map. The generation current map shows the relations between the exciting current, the rotation speed, and the output voltage and generation current.

In addition, the communication section 160 in the embodiment transmits an generation current estimation value obtained from the generation current control section 110 to the engine controller 3 and transmits an exciting current command value obtained from the engine controller 3 to the exciting current control section 120.

The power supply circuit 170A inputs a battery voltage and a generator output voltage and outputs their information to the generation current section 110A. Namely, the power supply circuit 170A has a function to measure the battery voltage and a function to detect the output voltage. And, in the operating point recovering operation later described in detail, the power supply section outputs the measured value of the battery voltage to the operating point recovery section 110c of the generation torque control section 110. In addition, in the power supply circuit 170A, the battery voltage and generator output voltage are converted into operating voltage, which is outputted to the AND circuit 1205 of the exciting current control 120. In the voltage comparator 1204 of the exciting current control section 120, a PWM signal having a corresponding duty ratio is outputted to the AND circuit 1205 by comparing an input after smoothed inputted in a plus terminal with a sawtooth signal inputted in a minus terminal. Then, a drive signal that is their logic product is outputted to the power transistor 130.

FIG. 14 is a flowchart showing a control example in the second embodiment. The same processing as in the first embodiment is performed in step 100, 102, and 104.

In step 110, compensated exciting current values If, N, V are assigned in the generation current map showing the relation between exciting current detected value If, rotation speed detected value N, output voltage detected value V, and generation current Iout to find an generation current estimated value. The generation current map is stored in the exciting current compensation section 110d.

In step 120, the exciting current is controlled through the exciting current control section using the found output estimated value.

As is seen in the foregoing, the second embodiment in the present invention is characterized in that the generation current estimation section has a function to compensate nonlinearity between the exciting current and generation current. Particularly, it is characterized by having a function to compensate that the generation current is a multiple-valued function of the exciting current.

In the method and the device of controlling exciting current of the second embodiment in the present invention, a high accuracy generation current estimation can be performed by compensating that the generation current is a multiple-valed function.

Particularly, it is characterized in that the generation current estimation section performs an operation that reduces an error of the generation current estimated value created by the hysteresis characteristics. Such a step allows a high accuracy generation current-controlled exciting current control to be realized because generation current estimation accuracy can be improved much more than in the conventional art.

An economical battery charging and discharging can be performed if an accurate generator generation current is utilized.

For others in the second embodiment in the present invention, the same effect as in the torque estimation error in the first embodiment can be obtained in the generation current estimation.

In addition, in the second embodiment, the exciting current controller capable of realizing a demanded generation current in high accuracy is described. However, an exciting current controller capable of simultaneously realizing a demanded generation torque and a demanded generation current in high accuracy can be also configured.

According to the second embodiment in the present invention described above, in the generation current estimation using the exciting current detected value, the relation between the exciting current detected value and generation current is corrected to a relation different from those relation at the time of forming a map. This allows the generation current estimation error caused by the hysteresis characteristics to be reduced.

Namely, because a map showing the relation between the exciting current and generation current is changed to a direction where the hysteresis error is substantially lessened in response to the operating conditions of the vehicle AC dynamo-electric machine 2, the generation current estimation error caused by the hysteresis characteristics can be reduced.

In addition, according to the second embodiment in the present invention, the field magnetic circuit of the vehicle AC dynamo-electric machine 2 is almost magnetically saturated by increasing the citation current at an appropriate timing (for example, just before or just after engine stop), a change in the relation between the exciting current and generation current derived from the displacement of the operating point caused by the hysteresis characteristics can be well compensated. Further, according to the second embodiment in the present invention, the same effect can be exerted because it is almost magnetically saturated before shipment likewise.

In addition, according to the second embodiment in the present invention, because a plurality of the relations (map) between the exciting current and generation current are stored, one of those is selected or an intermediate value of those in response to the operational conditions of the vehicle AC dynamo-electric machine 2), a change in the relation between the exciting current and generation current derived from the displacement of the operating point caused by the hysteresis characteristics can be well compensated.

Third Embodiment

The third embodiment in the present invention is described with reference to FIG. 15.

The third embodiment in the present invention relates to a vector control system where it is considered that the field circuit of a dynamo-electric machine has hysteresis characteristics, thereby an armature winding flux linkage quantity is a multiple-valued function to the exciting current.

In more detail, the third embodiment of the present invention provides a control method for controlling an exciting current of a multi-phase field winding type dynamo-electric machine having a rotor means, a stator means including an exciting winding, and air gap therebetween so as to obtain a demanded generation torque having a parametrical expression in an electric current forms such as a torque command current and a rotor flux command current.

Figure 15:
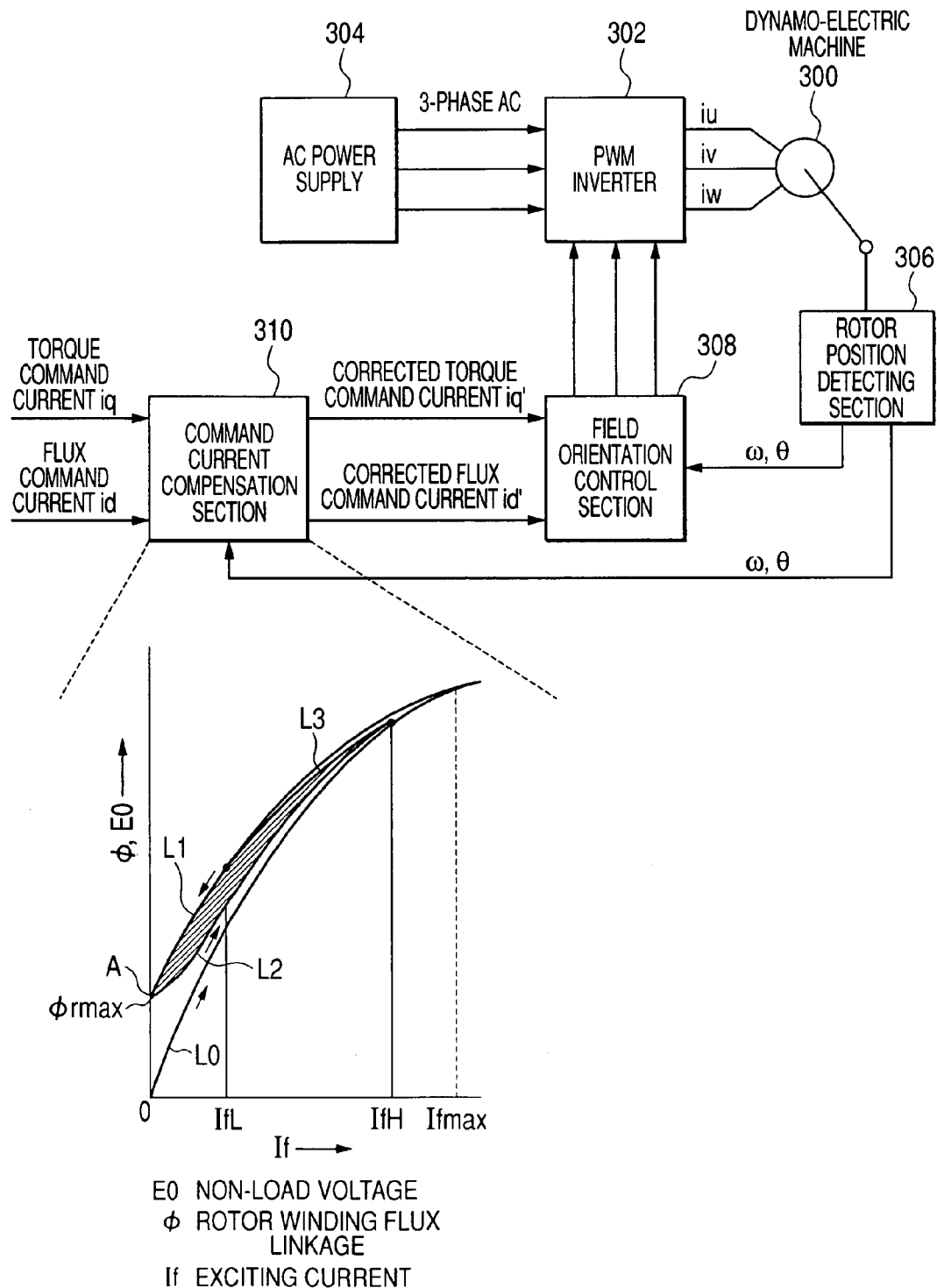
FIG. 15 shows a block diagram illustrating an arrangement of an exciting current control apparatus for use in the field winging type dynamo-electric machine according to the third embodiment of the present invention.

FIG. 15 is a block diagram of a field orientation system using a current controlled-inverter. In the field orientation system of the embodiment, a torque command value and a command value of the number of cross fluxes of a rotor are inputted and a stator command value corresponding thereto is calculated. The flux of the rotor is controlled by the stator current command value.

In the vector control system for an induction motor which is described about vector control for AC motors, for example, there has been a known technique written in a book "D. W. Novotny and T. A. Lipo, "Vector Control and Dynamics of AC Drive" (Oxford univ. press, 1966)". Accordingly to this known technique, a typical driving current supplied to a three phase alternating-current (AC) motor including a rotor and a stator is a current having three phases of iu, iv and iw. This three-phase driving current is controlled based on a demanded generation torque. In a heretofore common technique for controlling such a motor, a current having respective phases, i.e., the respective phases of u, v, w, are converted into currents of a d-q axis coordinate system consisting of an exciting current axis (a d-axis) and a torque current axis (a q-axis), and each converted axis current is controlled to meet an axis command value obtained from the demanded genera-tion torque. In other words, the vector control is carried out so as to control each of a torque and a rotor magnetic flux of an induction motor, independently of each other, by representing a current or magnetic flux of a three-phase induction motor in terms of a vector of a coordinate system known as the d-q coordinate system. The d-q coordinate system is a rotating coordinate system with two orthogonal axes which rotate in synchronization with a power source. One of two axes is taken in a direction of a rotor magnetic flux.

In the vector control, a torque command current iq, a magnetic flux command current id, and a slip angular frequency command value Sω are computed by the following mathematical expressions (1) to (3) using a demanded torque value T, a rotor magnetic flux command value φ, and some motor constants; which are as follows.

$$iq = \frac{T}{\phi} \times \frac{1}{P} \times \frac{L2}{Lm} \qquad (1)$$

$$id = \frac{\phi}{LM} \qquad (2)$$

$$S\omega = \frac{iq}{id} \times \frac{R2}{L2} \qquad (3)$$

where P is the number of pairs of poles of a motor, Lm is a mutual inductance of a motor, L1 is a primary self inductance of a motor, L2 is a secondary self inductance of a motor, and R2 is a secondary resistance of a motor.

Thus, in the vector control, a rotor magnetic flux command value φ is used to compute both the torque command current iq and the magnetic flux command current id. The rotor magnetic flux command value φ is computed from a rotation speed of the rotor ω which is directly measured or detected by some indirect method. In this embodiment, hysteresis characteristics that are contained in a field magnetic circuit in the motor are taken into consideration in computing both the torque command current iq and the magnetic flux command current id similarly to that described in the earlier embodiments accompanying with reference to FIG. 2.

As shown in FIG. 15, the field orientation system according to the present embodiment has a dynamo-electric machine 300, a PWM inverter 302, an alternating-current (AC) power supply 304, a rotor position detecting section 306, a field orientation control section 308, and a command current compensation 310. The AC power supply 304 generates three-phase AC currents and voltages.

This embodiment includes the command current compensation section 310. The flux command current compensation section 310 compensates the flux command current, considering the fact that an armature winding flux linkage quantity is a multiple-valued function of which variable is the exciting current, as described above.

The command current compensation section 310 outputs a corrected torque command current value iq' and a corrected magnetic flux command current value id' to the field orientation control section 308.

The field orientation control section 308 converts the corrected torque command current value iq' and the corrected magnetic flux command current value id' into a switching command for the PWM inverter 302. Motor driving currents iu, iv and iw, corresponding iq' and id' are supplied to respective phase coils of the three-phase motor 300. At the same time, a rotation angular frequency, which is outputted to the PWM inverter, is computed in the field orientation control section 308 by adding the slip angular frequency command value Sω to a rotation speed of the rotor ω obtained in the rotor position detecting section 306.

The rotor position detecting section 306 estimates the angular position θ and rotation speed of the rotor, and outputs the detected values of θ and ω to the field orientation control section 308 and the command current compensation 310. The detected angular position θ is used in the field orientation control section 308 for computing the switching command for the PWM inverter 302.

Figure 16:
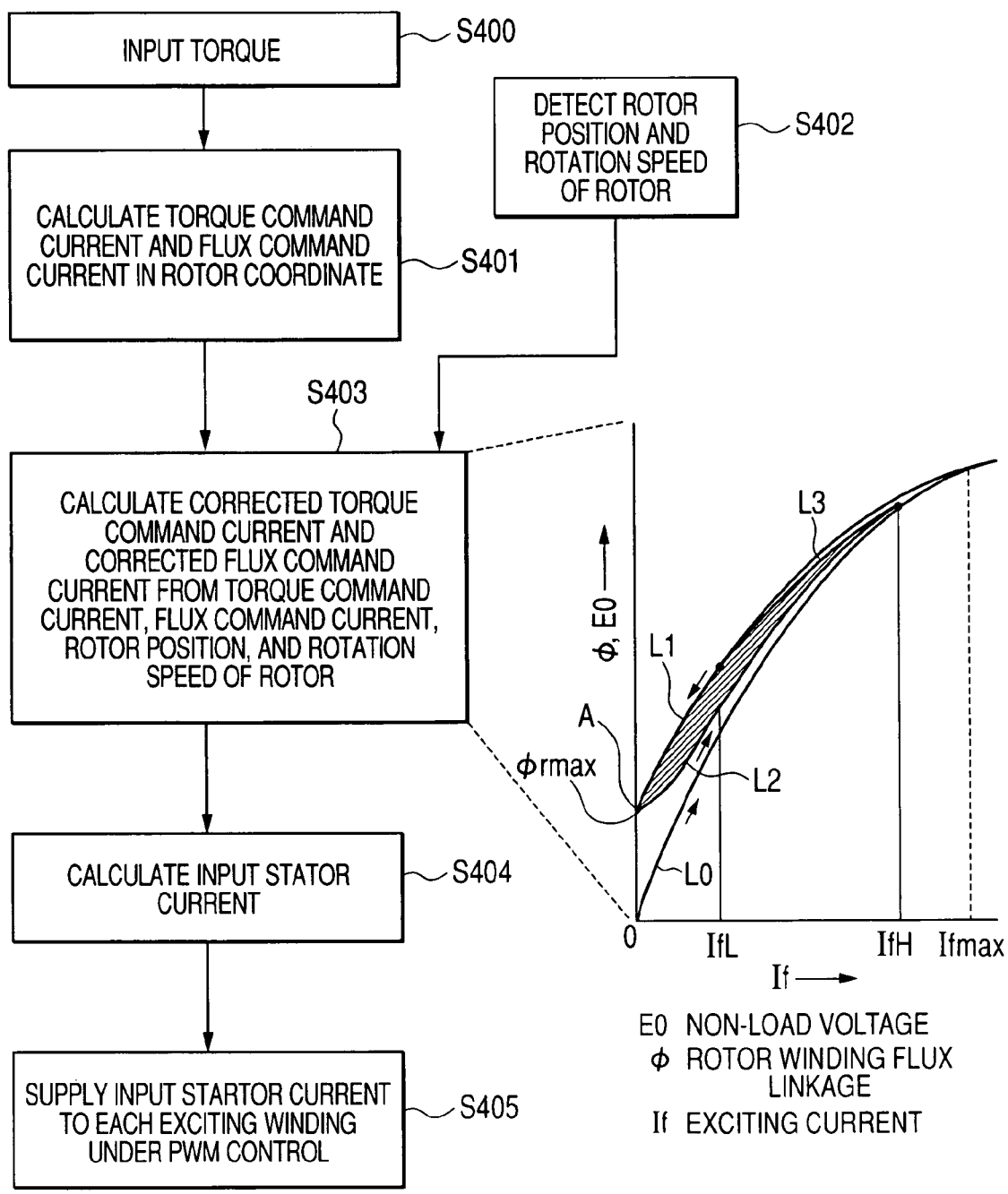
FIG. 16 is a flow chart illustrating an operational procedure of the exciting current control apparatus according to the third embodiment of the present invention.

In FIG. 16, a flow chart illustrating an operational procedure of the exciting current control apparatus according to the third embodiment of the present invention is shown.

At Step 400, a demand generation torque is inputted via an input device (not shown in FIGS. 15 and 16).

At Step 401, a torque command current iq and a flux command current id in a rotor coordinate are calculated from the demand generation torque and are inputted to the command current compensation section 310.

At Step 402, a rotor flux of the dynamo-electric machine 300 is detected. Usually the rotor flux of the dynamo-electric machine or a induction motor can not be detected directly in contrast to a case of synchronized motors. Some indirect methods for detecting or measuring the rotor flux are proposed and used. The detected rotor flux is used in the command current compensation section 310 and the field orientation control section 308.

At Step 403, the torque command current iq and the flux command current id are corrected so as to take into consideration of the phenomenon of hysteresis which are appeared in the magnetization process of the magnetic field circuit of the dynamo-electric machine. The ways of correcting are the same one in the first and second embodiment, thus it is not described in detail. The corrected torque command current iq' and the corrected flux command current id' are outputted from the command current compensation section 310 to the field orientation control section 308.

At Step 404, a coordinate transformation from a d-q coordinate system to a stator coordinate system about the corrected torque command current iq' and the corrected flux command current id' is carried out in the field orientation control section 308. This transformation is necessary to determine a field orientation of the stator flux. The determined corrected torque command current and the corrected flux command current in the stator coordinate is used in Step 405.

At Step 405, stator current is supplied to the stator of the dynamo-electric machine after the determined corrected torque command current and the corrected flux command current in the stator coordinate is modulated under pulse width modulation (PWM) control by the PWM inverter 302 that is connected to the AC power supply 304.

More detailedly, the rotor position detecting section 306 estimates the direction of rotor position θ and rotation speed ω of a rotor in the dynamo-electric machine by electrical or mechanical means, usually in an indirect method, for example by measuring an air-gap flux and estimating therefrom. The detected rotor position θ and rotation speed ω are outputted to the field orientation control section 308.

In the vector control, demanded torque values are inputted as torque command current iq and armature winding flux linkage command current iq of the rotor.

These torque command current iq and armature winding flux linkage command current id of the rotor are inputted in the command current compensation section 310 in the embodiment. In the command current compensation section 310, armature winding flux linkage flux command id of the rotor is compensated, considering that the armature winding flux linkage quantity is a multiple-valued function of the exciting current by the same method as in the first and the second embodiments. Then, the torque command value iq and the compensated armature winding flux linkage command current id' are outputted to the field orientation control section 308.

In the field orientation control section 308, a rotor flux value detected from the rotor position detecting section 306 and the added torque command current iq and compensated armature winding flux linkage command current id' of the rotor are used to calculate a value of current flowing in armature winding of each phase and the current values are outputted to the PWM inverter 302.

In the PWM inverter 302, an input from the AC power supply 304 is PWM controlled and current is supplied to the armature winding of each phase in three-phase dynamo-electric machine 300.

As is seen in the foregoing, the third embodiment in the present invention is characterized in that the command current compensation section 310 has a function to compensate that the armature winding flux linkage quantity is a multiple-valued function. Particularly, the present invention is characterized in that the command current compensation section 310 performs operations to reduce errors in the torque estimation values caused by hysteresis characteristics. Such a step allows a high accuracy torque-controlled exciting current control to be realized because torque estimation accuracy can be more largely improved than the conventional art.

In the device and the method of controlling exciting current of the third embodiment in the present invention, a high accuracy generation torque control can be performed by compensating that the armature winding flux linkage quantity is a multiple-valued function.

If these steps are taken, a high accuracy torque-controlled exciting current control can be realized, because a generation torque control accuracy can be more largely improved than a conventional art.

In addition, in the third embodiment, the exciting current controller capable of realizing a demanded generation current in high accuracy is described.

For others in the third embodiment in the present invention, the same effect as in the generation torque estimation error in the first embodiment.

The description of any of the first to third embodiments is merely exemplary in nature and, thus, variations that do not depart from the gist of the present invention are intended to be within the scope of the present invention. Such variations are not to be regarded as a departure from the spirit and scope of the present invention.

What is claimed is:

1. A control apparatus for controlling an exciting current supplied to an exciting winding of a field winding type dynamo-electric machine to obtain a demanded output thereof, comprising:
    an exciting current detecting circuit configured to detect the exciting current of the dynamo-electric machine, and to output a detected exciting current;
    a rotation speed detecting circuit configured to detect a rotation speed of a rotor of dynamo-electric machine and to output a detected rotation speed of the rotor;
    an output estimating circuit configured to estimate an output of the field winding type dynamo-electric machine based on a predetermined relation among the detected exciting current, the detected rotation speed, and the output of the field winding type dynamo-electric machine, and to output an estimated output resulting from the estimation; and an exciting current control circuit configured to correct the exciting current of the dynamo-electric machine based on the estimated output of the dynamo-electric machine so as to obtain the demanded output, and to supply the corrected exciting current to the exciting winding of the dynamo-electric machine;

wherein the output estimating circuit includes means for performing an estimation of the output of the dynamo-electric machine in consideration of a multi-valued functionality of the output of the dynamo-electric machine with respect to the exciting current of the exciting winding.

2. The control apparatus for controlling the exciting current of the field winding type dynamo-electric machine according to claim 1, wherein the output estimating circuit performs the estimation of the output of the field winding type dynamo-electric machine using historical data of the detected exciting current and the detected rotation speed of the rotor.

3. The control apparatus for controlling the exciting current of the field winding type dynamo-electric machine according to claim 1, wherein the output of the dynamo-electric machine is a generation torque thereof and the output estimating circuit is a generation torque estimating circuit configured to estimate the generation torque and output a result of the estimation as an estimated generation torque.

4. The control apparatus for controlling the exciting current of the field winding type dynamo-electric machine according to claim 2, wherein the output of the dynamo-electric machine is a generation torque thereof and the output estimating circuit is a generation torque estimating circuit configured to estimate the generation torque and output a result of the estimation as a estimated generation torque.

5. The control apparatus for controlling the exciting current of the field winding type dynamo-electric machine according to claim 1, wherein the output of the dynamo-electric machine is an generation current thereof and the output estimating circuit is a generation current estimating circuit configured to estimate the generation current and output a result of the estimation as a estimated generation current.

6. The control apparatus for controlling the exciting current of the field winding type dynamo-electric machine according to claim 2, wherein the output of the dynamo-electric machine is an generation current thereof and the output estimating circuit is a generation current estimating circuit configured to estimate the generation current and output a result of the estimation as a estimated generation current.

7. The control apparatus for controlling the exciting current of the field winding type dynamo-electric machine according to claim 4, wherein the generation torque estimating circuit includes means for performing estimation of the generation torque with managing phenomenon of hysteresis of a field circuit.

8. The control apparatus for controlling the exciting current of the field winding type dynamo-electric machine according to claim 7, wherein the generation torque estimating circuit has a first magnetization characteristic curve and a second magnetization characteristic curve, where the first magnetization characteristic curve is used for estimating the generation torque as a reference relationship between an armature winding flux linkage or its equivalence and the exciting current of the exciting winding in case where the exciting current of the exciting winding is increasing and the second magnetization characteristic curve is used as such a reference relationship in case where the exciting current of the exciting winding is decreasing, and a magnetization characteristic curve used in estimating the generation torque is selected from the first and the second magnetization characteristic curve based on a historical data of a driving condition of a field winding type dynamo-electric machine.

9. The control apparatus for controlling the exciting current of the field winding type dynamo-electric machine according to claim 8, wherein the generation torque estimating circuit makes a judgment whether the exciting current of the excitation winding is increasing or decreasing, and performs estimation of the generation torque with referring a theoretical magnetization characteristic curve which is obtained by mixing the first magnetization characteristic curve being percent in relative high amount and the second magnetization characteristic curve being percent in relative low amount if the exciting current of the excitation winding is increasing or performs estimation of the generation torque with referring a further theoretical magnetization characteristic curve which is obtained by mixing the first magnetization characteristic curve being percent in relative low amount and the second magnetization characteristic curve being percent in relative high amount if the exciting current of the excitation winding is decreasing.

10. The control apparatus for controlling the exciting current of the field winding type dynamo-electric machine according to claim 8, wherein the generation torque estimating circuit includes means for performing estimation of the generation torque with referring an average magnetization characteristic curve of the first and the second magnetization characteristic curve based on a historical data of a driving condition of a field winding type dynamo-electric machine.

11. The control apparatus for controlling the exciting current of the field winding type dynamo-electric machine according to claim 8, wherein the second magnetization characteristic curve illustrating a relationship between an armature winding flux linkage or its equivalence and the exciting current of the exciting winding is plotted in an experimental procedure where the exciting current of the exciting winding is monotonically decreasing after the exciting winding has been magnetized to an almost flux saturation.

12. The control apparatus for controlling the exciting current of the field winding type dynamo-electric machine according to claim 8, wherein the first magnetization characteristic curve illustrating a relationship between an armature winding flux linkage or its equivalence and the exciting current of the exciting winding is plotted in an experimental procedure where the exciting current of the exciting winding is monotonically increasing after the exciting current of the exciting winding has been decreased and reached to zero following the exciting winding had been magnetized to an almost flux saturation.

13. The control apparatus for controlling the exciting current of the field winding type dynamo-electric machine according to claim 9, wherein the second magnetization characteristic curve illustrating a relationship between an armature winding flux linkage or its equivalence and the exciting current of the exciting winding is plotted in an experimental procedure where the exciting current of the exciting winding is monotonically decreasing after the exciting winding has been magnetized to an almost flux saturation.

14. The control apparatus for controlling the exciting current of the field winding type dynamo-electric machine according to claim 9,
wherein the first magnetization characteristic curve illustrating a relationship between an armature winding flux linkage or its equivalence and the exciting current of the exciting winding is plotted in an experimental procedure where the exciting current of the exciting winding is monotonically increasing after the exciting current of the exciting winding has been decreased and reached to zero following the exciting winding had been magnetized to an almost flux saturation.

15. The control apparatus for controlling the exciting current of the field winding type dynamo-electric machine according to claim 10,
wherein the second magnetization characteristic curve illustrating a relationship between an armature winding flux linkage or its equivalence and the exciting current of the exciting winding is plotted in an experimental procedure where the exciting current of the exciting winding is monotonically decreasing after the exciting winding has been magnetized to an almost flux saturation.

16. The control apparatus for controlling the exciting current of the field winding type dynamo-electric machine according to claim 10,
wherein the first magnetization characteristic curve illustrating a relationship between an armature winding flux linkage or its equivalence and the exciting current of the exciting winding is plotted in an experimental procedure where the exciting current of the exciting winding is monotonically increasing after the exciting current of the exciting winding has been decreased and reached to zero following the exciting winding had been magnetized to an almost flux saturation.

17. The control apparatus for controlling the exciting current of the field winding type dynamo-electric machine according to claim 7,
wherein the field circuit has been magnetized to an almost flux saturation by the passage of the larger exciting current through the field circuit than a predetermined value for a predetermined time before the initial use of field circuit of the field winding type dynamo-electric machine.

18. The control apparatus for controlling the exciting current of the field winding type dynamo-electric machine according to claim 7,
wherein the field circuit is magnetized to an almost flux saturation by the passage of the enough exciting current for an enough time in a timely operation in which a predetermined condition of the field winding type dynamo-electric machine is satisfied.

19. The control apparatus for controlling the exciting current of the field winding type dynamo-electric machine according to claim 18,
wherein the field circuit is magnetized to an almost flux saturation by the passage of the exciting current when the rotor of the field winding type dynamo-electric machine is stopping.

20. The control apparatus for controlling the exciting current of the field winding type dynamo-electric machine according to claim 18,
wherein the field circuit is magnetized to an almost flux saturation by the passage of the exciting current when the rotation speed of the rotor of the field winding type dynamo-electric machine is lower than a predetermined value.

21. The control apparatus for controlling the exciting current of the field winding type dynamo-electric machine according to claim 18, further comprising:
a battery being charged by supplying electric power from the field winding type dynamo-electric machine being used as a generator,
wherein the field circuit is magnetized to an almost flux saturation by the passage of the exciting current when a representative value of state of charge of the battery is lower than a predetermined value.

22. The control apparatus for controlling the exciting current of the field winding type dynamo-electric machine according to claim 6,
the output estimating circuit performs estimation of the generation current with managing phenomenon of hysteresis of a field circuit.

23. The control apparatus for controlling the exciting current of the field winding type dynamo-electric machine according to claim 6,
wherein the generation current estimating circuit has a first magnetization characteristic curve and a second magnetization characteristic curve, where the first magnetization characteristic curve is used for estimating the generation current as a reference relationship between an armature winding flux linkage or its equivalence and the exciting current of the exciting winding in case where the exciting current of the exciting winding is increasing and the second magnetization characteristic curve is used as such a reference relationship in case where the exciting current of the exciting winding is decreasing, and a magnetization characteristic curve used in estimating the generation current is selected from the first and the second magnetization characteristic curve based on a historical data of a driving condition of the dynamo-electric machine.

24. The control apparatus for controlling the exciting current of the field winding type dynamo-electric machine according to claim 22,
wherein the generation current estimating circuit makes a judgment whether the exciting current of the excitation winding is increasing or decreasing, and performs estimation of the generation torque with referring a theoretical magnetization characteristic curve which is obtained by mixing the first magnetization characteristic curve being percent in relative high amount and the second magnetization characteristic curve being percent in relative low amount if the exciting current of the excitation winding is increasing or performs estimation of the generation current with referring a further theoretical magnetization characteristic curve which is obtained by mixing the first magnetization characteristic curve being percent in relative low amount and the second magnetization characteristic curve being percent in relative high amount if the exciting current of the excitation winding is decreasing.

25. The control apparatus for controlling the exciting current of the field winding type dynamo-electric machine according to claim 22, wherein the generation current estimating circuit performs estimation of the generation current with referring an average magnetization characteristic curve of the first and the second magnetization characteristic curve based on a historical data of a driving condition of a field winding type dynamo-electric machine.

26. A control method for controlling an exciting current supplied to an exciting winding of a field winding type dynamo-electric machine to obtain a demanded output thereof, comprising steps of:
   an exciting current detecting step configured to detect the exciting current of the dynamo-electric machine, and to output a detected exciting current;
   a rotation speed detecting step configured to detect a rotation speed of a rotor of dynamo-electric machine and to output a detected rotation speed of the rotor;
   an output estimating step configured to estimate an output of the field winding type dynamo-electric machine based on a predetermined relation among the detected exciting current, the detected rotation speed, and the output of the field winding type dynamo-electric machine, and to output an estimated output resulting from the estimation; and
   an exciting current control step configured to correct the exciting current of the f dynamo-electric machine based on the estimated output of the dynamo-electric machine so as to obtain the demanded output, and to supply the corrected exciting current to the exciting winding of the dynamo-electric machine;
   wherein the output estimating step performs an estimation of the output of the field winding type dynamo-electric machine considering a multi-valued functionality of the output of the field winding type dynamo-electric machine with respect to the exciting current of the exciting winding.

27. The control method for controlling the exciting current of the field winding type dynamo-electric machine according to claim 26,
   wherein the output estimating step performs the estimation of the output of the dynamo-electric machine using a historical value of the detected exciting current and the detected rotation speed of the rotor.

28. The control method for controlling the exciting current of the field winding type dynamo-electric machine according to claim 26,
   wherein the output of the dynamo-electric machine is a generation torque thereof and the output estimating step is a generation torque estimating step being configured to estimate the generation torque and output a result of the estimation as a estimated generation torque.

29. The control method for controlling the exciting current of the field winding type dynamo-electric machine according to claim 27,
   wherein the output of the dynamo-electric machine is a generation torque thereof and the output estimating circuit is a generation torque estimating circuit being configured to estimate the generation torque and output a result of the estimation as a estimated generation torque.

30. The control method for controlling the exciting current of the field winding type dynamo-electric machine according to claim 26,
   wherein the output of the dynamo-electric machine is an generation current thereof and the output estimating step is a generation current estimating step being configured to estimate the generation current and output a result of the estimation as a estimated generation current.

31. The control method for controlling the exciting current of the field winding type dynamo-electric machine according to claim 27,
   wherein the output of the dynamo-electric machine is an generation current thereof and the output estimating step is a generation current estimating step being configured to estimate the generation current and output a result of the estimation as a estimated generation current.

32. The control method for controlling the exciting current of the field winding type dynamo-electric machine according to claim 28,
   the generation torque estimating step performs estimation of the generation torque with managing phenomenon of hysteresis of a field circuit.

33. The control method for controlling the exciting current of the field winding type dynamo-electric machine according to claim 28,
   wherein the generation torque estimating step has a first magnetization characteristic curve and a second magnetization characteristic curve, where the first magnetization characteristic curve is used for estimating the generation torque as a reference relationship between an armature winding flux linkage or its equivalence and the exciting current of the exciting winding in case where the exciting current of the exciting winding is increasing and the second magnetization characteristic curve is used as such a reference relationship in case where the exciting current of the exciting winding is decreasing, and a magnetization characteristic curve used in estimating the generation torque is selected from the first and the second magnetization characteristic curve based on a historical data of a driving condition of a field winding type dynamo-electric machine; and
   the generation torque estimating step further comprising steps of:
   an judging step making a judgment whether a first estimating step or a second estimating step is carried out based on whether the exciting current of the excitation winding is increasing or decreasing,
   wherein the first estimating step performs estimation of the power generation torque with referring a magnetization characteristic curve which is obtained by mixing the first magnetization characteristic curve being percent in relative high amount and the second magnetization characteristic curve being percent in relative low amount if the exciting current of the excitation winding is increasing, and
   the second estimating step performs estimation of the power generation torque with referring a further magnetization characteristic curve which is obtained by mixing the first magnetization characteristic curve being percent in relative low amount and the second magnetization characteristic curve being percent in relative high amount if the exciting current of the excitation winding is decreasing.

34. The control method for controlling the exciting current of the field winding type dynamo-electric machine according to claim 30,
   the generation current estimating step performs estimation of the generation torque with managing phenomenon of hysteresis of a field circuit.

35. The control method for controlling the exciting current of the field winding type dynamo-electric machine according to claim 34,
   wherein the current estimating step has a first magnetization characteristic curve and a second magnetization characteristic curve, where the first magnetization characteristic curve is used for estimating the generation current as a reference relationship between an armature winding flux linkage or its equivalence and the exciting current of the exciting winding in case where the exciting current of the exciting winding is increasing and the second magnetization characteristic curve is used as such a reference relationship in case where the exciting current of the exciting winding is decreasing, and a magnetization characteristic curve used in estimating the generation current is selected from the first and the second magnetization characteristic curve based on a historical data of a driving condition of a field winding type dynamo-electric machine; and the generation current estimating step further comprising steps of:

an judging step making a judgment whether a first estimating step or a second estimating step is carried out based on whether the exciting current of the excitation winding is increasing or decreasing, wherein the first estimating step performs estimation of the power generation current with referring a magnetization characteristic curve which is obtained by mixing the first magnetization characteristic curve being percent in relative high amount and the second magnetization characteristic curve being percent in relative low amount if the exciting current of the excitation winding is increasing, and the second estimating step performs estimation of the power generation current with referring a further magnetization characteristic curve which is obtained by mixing the first magnetization characteristic curve being percent in relative low amount and the second magnetization characteristic curve being percent in relative high amount if the exciting current of the excitation winding is decreasing.

36. A control method for controlling an exciting current of a multi-phase field winding type dynamo-electric machine having a rotor means, a stator means including an exciting winding, and air gap therebetween so as to obtain a demanded generation torque having a parametrical expression in an electric current forms such as a torque command current and a rotor flux command current, comprising steps of:

a) measuring a rotor position and a rotation speed of the rotor;

b) calculating a rotor flux parameters from the measured rotor position and rotation speed of the rotor;

c) determining a phase and an amplitude of an input electric current towards each exciting winding of the stator means based on the rotor flux and the demanded generation torque with taking into consideration a multi-valued functionality of an armature winding flux linkage or its equivalence and the exciting current of the exciting winding; and d) controlling a field orientation of a rotor command flux of the rotor means based on the determined phase and the determined amplitude of the input electric current of each exciting winding.

37. The control method for controlling an exciting current of a multi-phase field winding type dynamo-electric machine according to claim 36 wherein, in step (c), determining the phase and the amplitude of the input electric current towards each exciting winding of the stator means based on the rotor flux and the demanded generation torque taking into consideration phenomenon of hysteresis in magnetization processes of the exciting winding.

38. The control method for controlling an exciting current of a multi-phase field winding type dynamo-electric machine according to claim 37 wherein, in step (c), wherein the phase and the amplitude of the input electric current towards each exciting winding of the stator means based on the rotor flux and the demanded generation torque with referencing a first magnetization characteristic curve of the excitation winding and a second magnetization characteristic curve, where the first magnetization characteristic curve is used for estimating the phase and the amplitude of the input electric current of each of exciting winding as a reference relationship between an armature winding flux linkage or its equivalence and the exciting current of the exciting winding in case where the exciting current of the exciting winding is increasing and the second magnetization characteristic curve is used as such a reference relationship in case where the exciting current of the exciting winding is decreasing.

39. A control apparatus for controlling an exciting current of a multi-phase field winding type dynamo-electric machine having a rotor means, a stator means including an exciting winding, and air gap therebetween so as to obtain a demanded generation torque having a parametrical expression in an electric current forms such as a torque command current and a rotor flux command current, comprising:

a) means for measuring a rotor position and a rotation speed of the rotor;

b) means for calculating a rotor flux parameters from the measured rotor position and rotation speed of the rotor;

c) means for determining a phase and an amplitude of an input electric current towards each exciting winding of the stator means based on the rotor flux and the demanded generation torque with taking into consideration a multi-valued functionality of an armature winding flux linkage or its equivalence and the exciting current of the exciting winding; and d) means for controlling a field orientation of a rotor command flux of the rotor means based on the determined phase and the determined amplitude of the input electric current of each exciting winding.

40. The control apparatus for controlling an exciting current of a multi-phase field winding type dynamo-electric machine according to claim 39 wherein the means for determining the phase and the amplitude of the input electric current towards each exciting winding of the stator means based on the rotor flux and the demanded generation torque taking into consideration phenomenon of hysteresis in magnetization processes of the exciting winding.

41. The control method for controlling an exciting current of a multi-phase field winding type dynamo-electric machine according to claim 40 wherein the means for determining the phase and the amplitude of the input electric current towards each exciting winding of the stator means based on the rotor flux and the demanded generation torque with referencing a first magnetization characteristic curve of the excitation winding and a second magnetization characteristic curve, where the first magnetization characteristic curve is used for estimating the phase and the amplitude of the input electric current of each of exciting winding as a reference relationship between an armature winding flux linkage or its equivalence and the exciting current of the exciting winding in case where the exciting current of the exciting winding is increasing and the second magnetization characteristic curve is used as such a reference relationship in case where the exciting current of the exciting winding is decreasing.

* * * * *